US011820785B2

(12) United States Patent
Yun

(10) Patent No.: US 11,820,785 B2
(45) Date of Patent: Nov. 21, 2023

(54) SILOXANE COMPOUND AND POLYIMIDE PRECURSOR COMPOSITION COMPRISING SAME

(71) Applicant: LG CHEM, LTD., Seoul (KR)

(72) Inventor: Cheolmin Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 737 days.

(21) Appl. No.: 16/757,539

(22) PCT Filed: Jan. 22, 2019

(86) PCT No.: PCT/KR2019/000877
§ 371 (c)(1),
(2) Date: Apr. 20, 2020

(87) PCT Pub. No.: WO2019/235712
PCT Pub. Date: Dec. 12, 2019

(65) Prior Publication Data
US 2021/0188881 A1 Jun. 24, 2021

(30) Foreign Application Priority Data

Jun. 7, 2018 (KR) ......................... 10-2018-0065244
Oct. 17, 2018 (KR) ......................... 10-2018-0123538

(51) Int. Cl.
*C08L 83/08* (2006.01)
*C07F 7/08* (2006.01)
(Continued)

(52) U.S. Cl.
CPC .......... *C07F 7/0838* (2013.01); *C07F 7/0889* (2013.01); *C08G 73/10* (2013.01);
(Continued)

(58) Field of Classification Search
CPC .............................. C08G 77/388; C08L 83/08
See application file for complete search history.

(56) References Cited

U.S. PATENT DOCUMENTS 4,818,806 A   4/1989  Kunimune et al.
5,254,657 A  10/1993  Inoue
(Continued)

FOREIGN PATENT DOCUMENTS

CN    104854165 A   8/2015
EP      2033985 A2   3/2009
(Continued)

OTHER PUBLICATIONS

Extended Search Report issued for European Patent Application No. 19 815 299.3 dated Jul. 21, 2020, 5 pages.
(Continued)

*Primary Examiner* — Margaret G Moore
(74) *Attorney, Agent, or Firm* — ROTHWELL, FIGG, ERNST & MANBECK, P.C.

(57) ABSTRACT

The present invention provides a siloxane compound having a novel structure, the compound not being reactive with a polyamic acid which is a polyimide precursor. In addition, provided is a polyimide precursor composition having improved storage stability by adding the siloxane compound as an enhancer for adhesion between a polyimide and a substrate made of an inorganic material. According to the present invention, provided is a multifunctional polyimide film having improved adhesiveness with a substrate made of an inorganic material while having improved optically isotropic characteristics and reduced residual stress characteristics with respect to a substrate.

13 Claims, 9 Drawing Sheets

(51) Int. Cl.
  *C08G 73/10* (2006.01)
  *G02F 1/00* (2006.01)
  *C08G 73/12* (2006.01)
  *C08G 77/38* (2006.01)

(52) U.S. Cl.
  CPC ......... *C08G 73/123* (2013.01); *C08G 73/125* (2013.01); *C08G 73/126* (2013.01); *C08G 77/38* (2013.01); *G02F 1/0063* (2013.01); *C08L 83/08* (2013.01); *G02F 2202/103* (2013.01)

(56) References Cited

U.S. PATENT DOCUMENTS

| | | | |
|---|---|---|---|
| 5,376,733 | A | 12/1994 | Okinoshima et al. |
| 7,926,930 | B2 | 4/2011 | Satou et al. |
| 8,398,964 | B2 | 3/2013 | Kamei et al. |
| 8,420,770 | B2 * | 4/2013 | Furuta .................. C08G 73/106 524/217 |
| 8,592,499 | B2 | 11/2013 | Araki et al. |
| 9,975,997 | B2 | 5/2018 | Jeon et al. |
| 10,508,175 | B2 | 12/2019 | Choi et al. |
| 10,647,883 | B2 | 5/2020 | Yun et al. |
| 2008/0004413 | A1 | 1/2008 | Schorzman et al. |
| 2023/0002562 | A1* | 1/2023 | Cha ........................ C08G 77/18 |

FOREIGN PATENT DOCUMENTS

| | | |
|---|---|---|
| JP | S61-287926 A | 12/1986 |
| JP | H04-359061 A | 12/1992 |
| JP | H05-043700 A | 2/1993 |
| JP | 2009-185213 A | 8/2009 |
| JP | 2009-203400 A | 9/2009 |
| JP | 2011-026485 A | 2/2011 |
| JP | 2013-112750 A | 6/2013 |
| JP | 5776516 B2 | 9/2015 |
| JP | 2016-047878 A | 4/2016 |
| JP | 2016-531997 A | 10/2016 |
| JP | 2009-035702 A | 2/2019 |
| KR | 2016-0115770 A | 10/2016 |
| KR | 10-1787941 B1 | 1/2017 |
| TW | 200811253 A | 3/2008 |

OTHER PUBLICATIONS

International Search Report issued for International Application No. PCT/KR2019/000877 dated May 3, 2019, 4 pages.

Chakrabarty et al., "PDMS-Fluorous Polyoxetane-PDMS Triblock Hybrid Elastomers: Tough and Transparent with Novel Bulk Morphologies", Macromolecules, 2012,45,7900-7913.

Fir et al., "Corrosion Studies and Interfacial Bonding of Urea/Poly(dimethylsiloxane) Sol/Gel Hydrophobic Coatings on AA 2024 Aluminum Alloy", Langmuir, 2007, 23, 5505-5514.

Maver et al., "Dynamic studies of Ormosil membranes", Journal of Non-crystalline Solids 354 (2008) 680-687.

Schramm et al., "Synthesis and characterization of an aliphatic monoimide-bridged polysilsesquioxane by the sol-gel route", J Sol-Gel Sci Technol (2010) vol. 53, 579-586.

Schramm et al., "Synthesis and Characterization of Novel Ultrathin Polyimide Fibers via Sol-Gel Process and Electrospinning", J. Appl. Polym. Sci. 2013, vol. 128, 1274-1281.

Office Action issued for Japanese Patent Application No. 2020-516434 dated Mar. 23, 2021, 7 pages.

* cited by examiner

[Fig. 1]
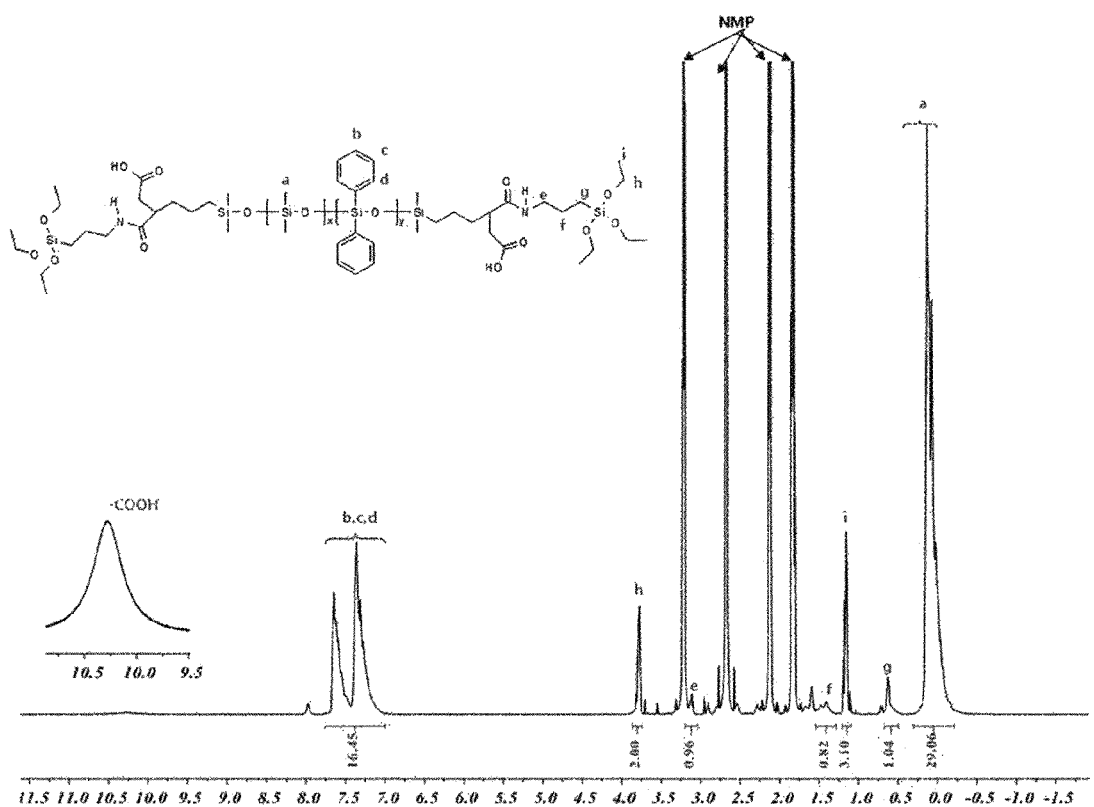

[Fig. 2]
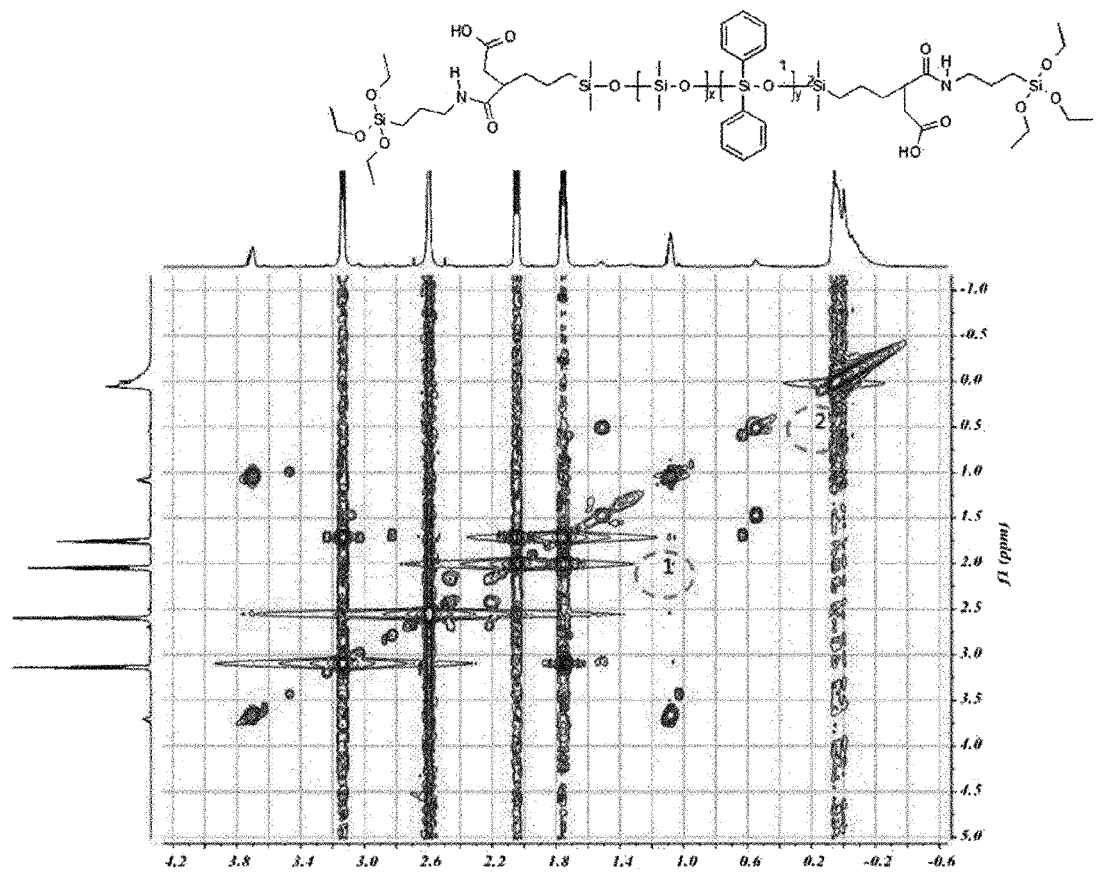

[Fig. 3]
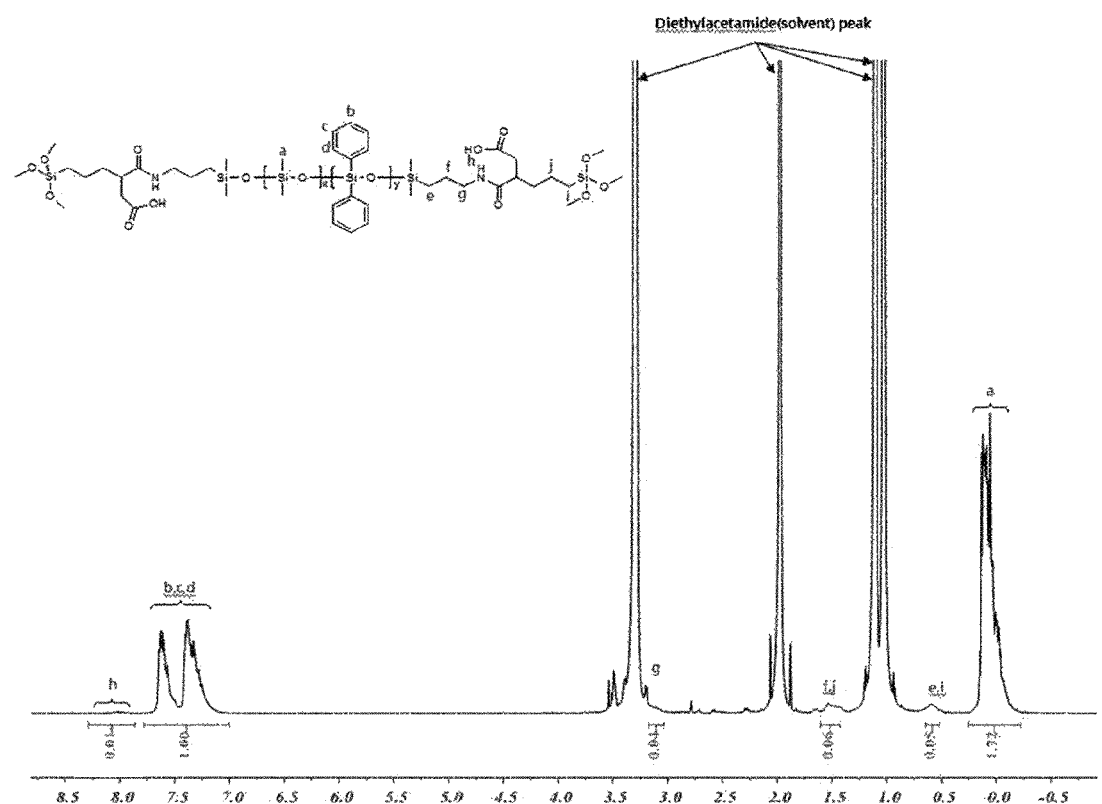

[Fig. 4]
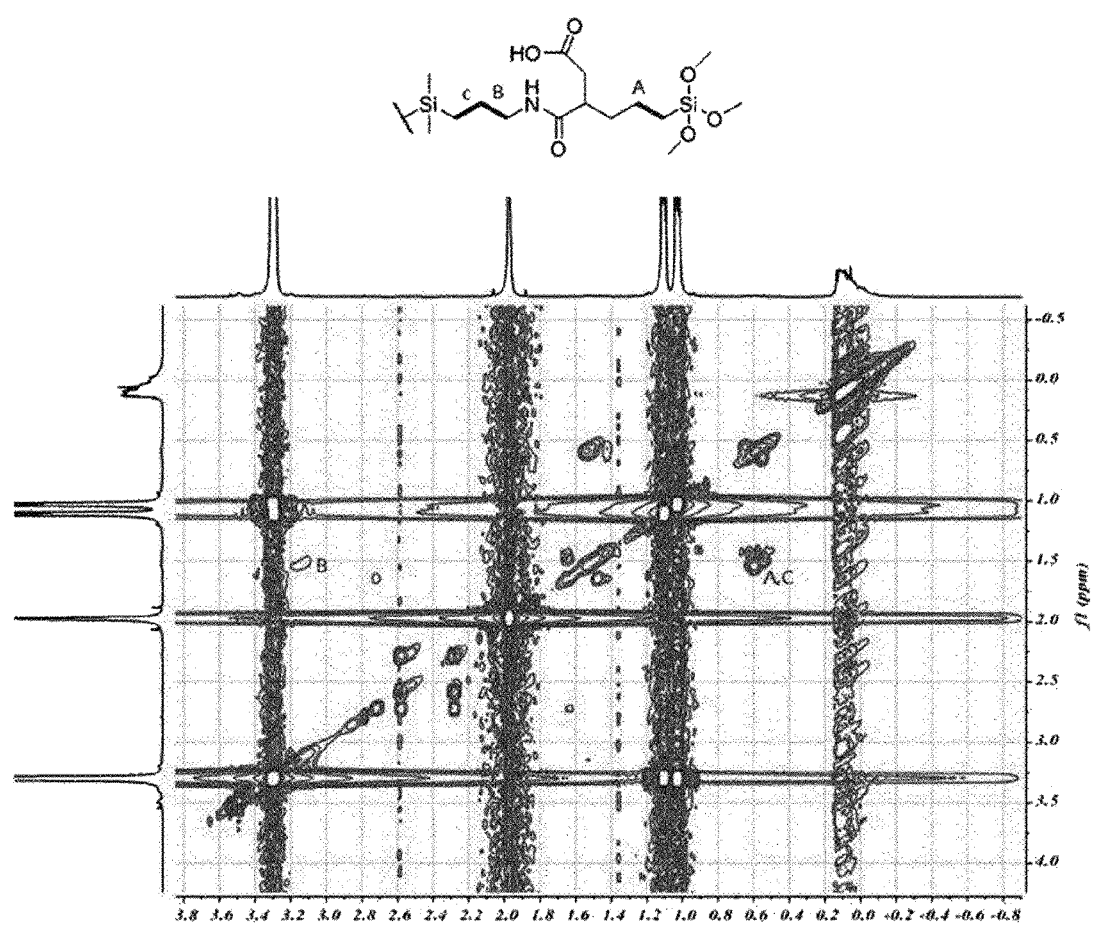

[Fig. 5]
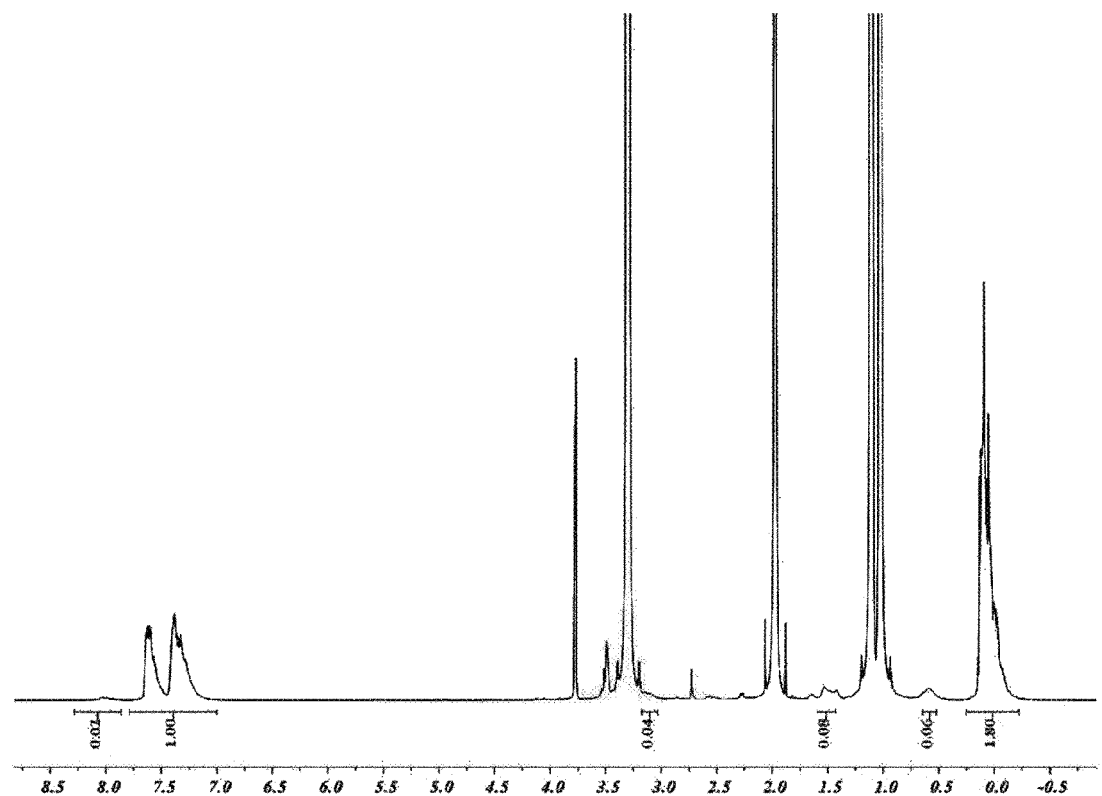

[Fig. 6]
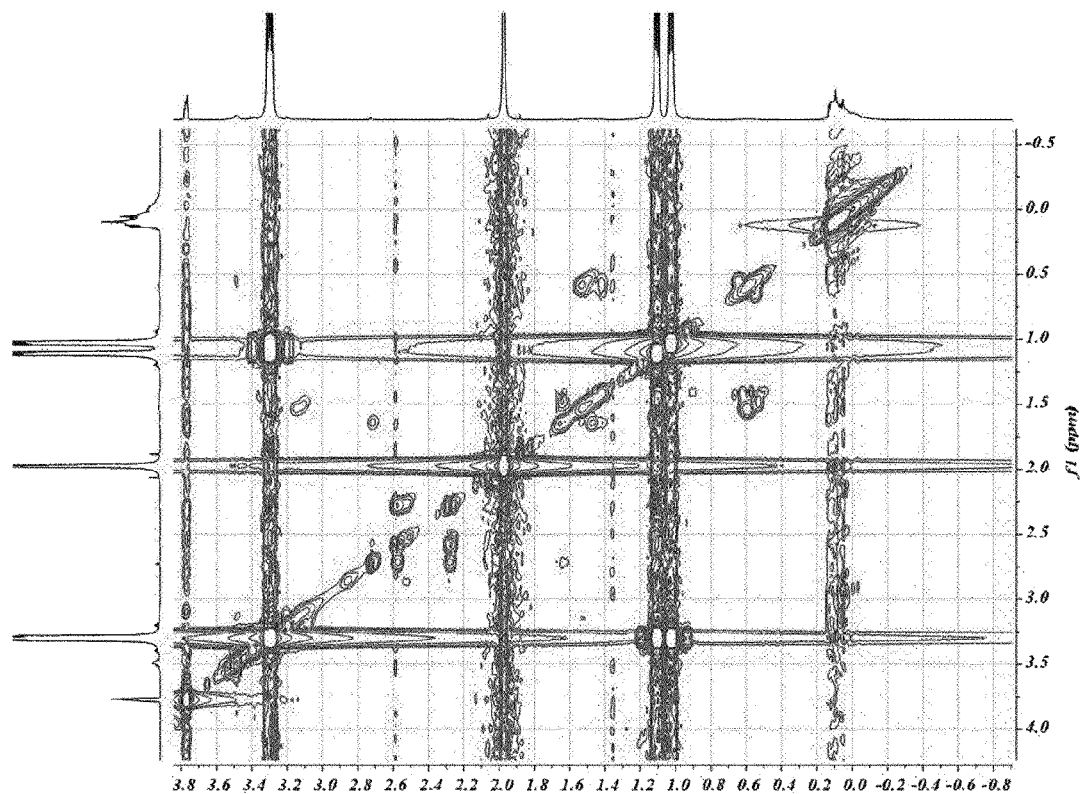

[Fig. 7]
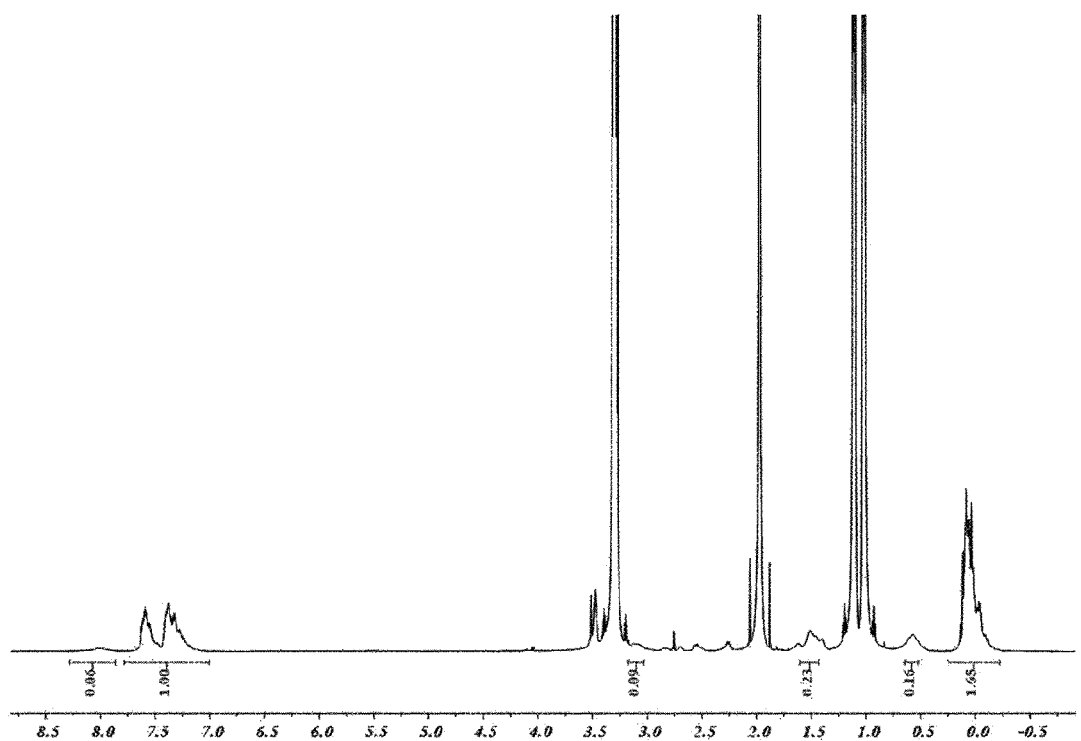

[Fig. 8]
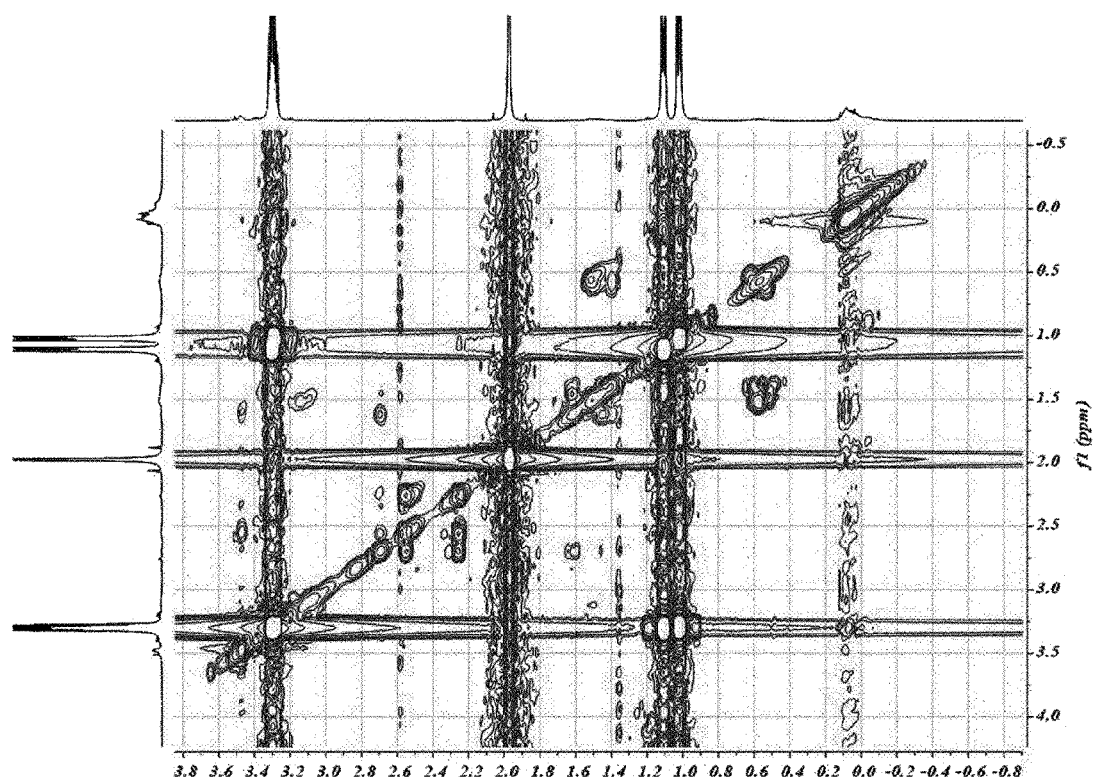

[Fig. 9]
1) Haze in a mixing state after adding varnish
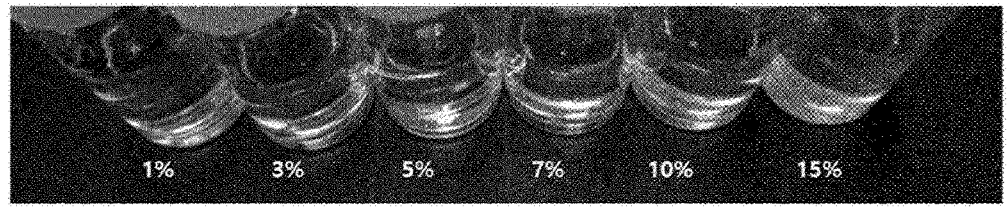
[Fig. 10]
Haze measurement in a PAA coating state before curing
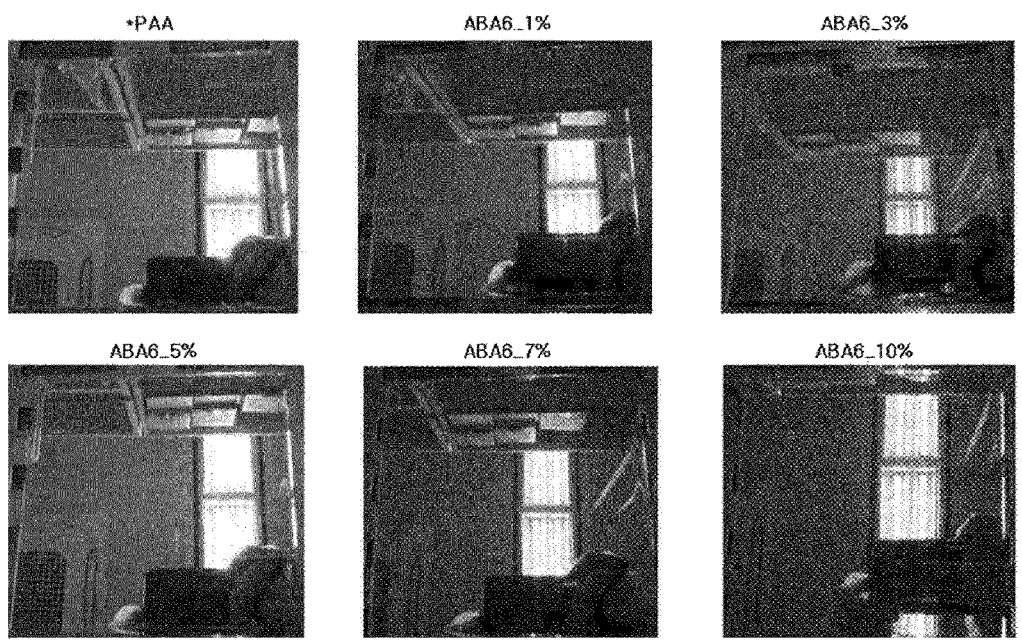

SILOXANE COMPOUND AND POLYIMIDE PRECURSOR COMPOSITION COMPRISING SAME

BACKGROUND OF THE INVENTION

1. Field of the Invention

This application is a 35 U.S.C. § 371 National Phase Entry Application from PCT/KR2019/000877, filed on Jan. 22, 2019, and designating the United States, which claims the benefit of priorities to Korean Patent Application Nos. 10-2018-0065244, filed on Jun. 7, 2018 and 10-2018-0123538, filed on Oct. 17, 2018, the entire disclosures of which are incorporated herein by reference.

The present invention relates to a siloxane compound having a novel structure and a polyimide precursor composition containing same.

2. Description of the Related Art

In recent years, weight reduction and miniaturization of products have been emphasized in the field of display. However, currently used glass substrates are heavy and brittle and have a difficulty in a continuous process. Accordingly, researches are actively carried out for applying a plastic substrate having advantages of lightness, flexibility, and applicability to continuous process and substitutable for a glass substrate, to a cell phone, a notebook and a PDA.

In particular, a polyimide (PI) resin has an advantage that it is easy to be synthesized, is formed to a thin film and does not require a crosslinking group for curing. Recently, due to weight reduction and precision of electronic products, a polyimide is widely used as a material for integration in semiconductor such as LCD, PDP, etc. In particular, many studies have progressed for PI to use in a flexible plastic display board having light and flexible properties.

A polyimide (PI) film, which is produced by film-forming the polyimide resin, is generally prepared by solution polymerization of aromatic dianhydride and aromatic diamine or aromatic diisocyanate to prepare a solution of polyamic acid derivative, coating the solution on a silicon wafer or a glass, and curing by heat treatment.

In order to use the polyimide resin on a circuit board, a semiconductor substrate, a flexible display substrate, etc., it is necessary to have excellent adhesion with a silicon wafer, a glass or a metal in addition to physical properties such as heat oxidation, heat resistance, radiation resistance, low-temperature characteristics and chemical resistance.

Generally, an adhesion promoter such as a silane compound is used to improve adhesive force between a polyimide film and a glass or metal surface. In case that the adhesion promoter is applied to the surface to improve adhesive force, foreign substances may be generated due to application of the adhesion promoter. As a result, a surface of the substrate may not be formed smoothly. Further, a coating process should be repeated one more time after an application process, which may result in poor economic efficiency.

When the adhesion promoter is directly added to a polyamic acid, the problem caused by the application can be minimized, but the amino group of the silane compound may be precipitated as a salt with a carboxylic acid of the polyamic acid to generate foreign substances on the substrate, which is not preferable.

It is necessary to develop an adhesion promoting agent for a polyimide resin which can improve productivity and process efficiency by omitting the step for enhancing adhesive force of the final product and which can remarkably improve the surface adhesive force while securing excellent mechanical properties without deteriorating the appearance characteristics of the polyimide resin.

SUMMARY OF THE INVENTION

The present invention provides a siloxane compound having a novel structure which is not reactive with a polyamic acid structure.

The present invention also provides a polyimide precursor composition comprising the siloxane compound.

The present invention also provides a polyimide film produced from the polyimide precursor composition.

Further, the present invention provides a display substrate comprising the polyimide film.

The present invention provides a siloxane compound represented by the following formula (1) or (2).

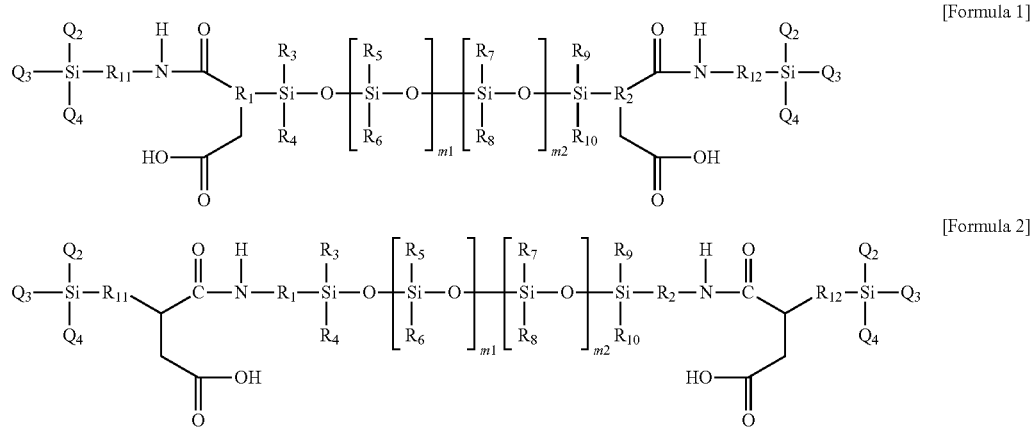

[Formula 1]

[Formula 2]

In formulas 1 and 2, $Q_2$, $Q_3$ and $Q_4$ are each independently selected from a hydrogen atom, an alkyl group having 1 to 5 carbon atoms, and an alkoxy group having 1 to 5 carbon atoms, $R_1$, $R_2$, $R_{11}$ and $R_{12}$ are each independently a single bond or an organic group having 1 to 20 carbon atoms, $R_3$ to $R_{10}$ are each independently an aliphatic group having 1 to 3 carbon atoms or an aromatic group having 6 to 12 carbon atoms, and m1 and m2 are each independently an integer of 0 or more.

According to one embodiment, m1 or m2 is an integer of 1 or more, and the molecular weight of the compound of the formula 1 or 2 may be 10,000 or less.

According to one embodiment, the compound represented by formula 1 or formula 2 may be represented by the following formula 1-1 or formula 2-1, respectively.

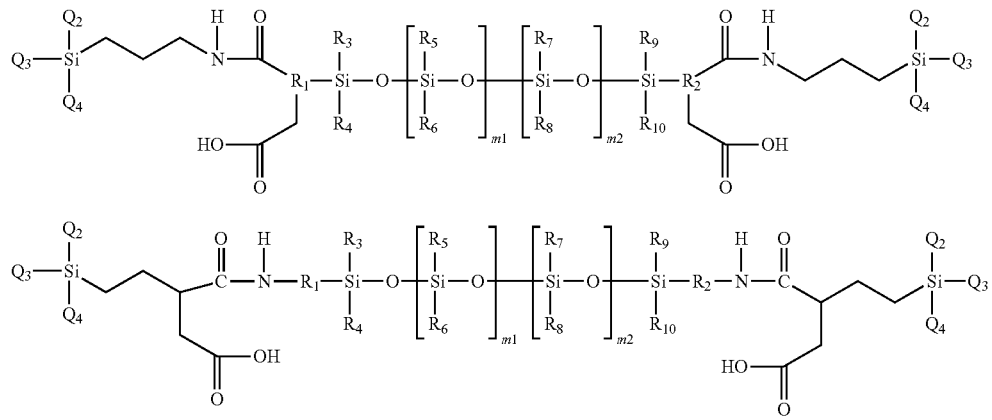

According to one embodiment, $R_1$, $R_2$, $R_{11}$ and $R_{12}$ are each independently a single bond or an alkylene group having 1 to 10 carbon atoms.

According to one embodiment, at least one of $R_3$ to $R_{10}$ may comprise an aromatic group having 6 to 12 carbon atoms.

According to one aspect of the present invention, there is provided a method for producing the compound of formula 1 or formula 2 by reacting a compound of the following formula a with a compound of the following formula b-1 or formula b-2.

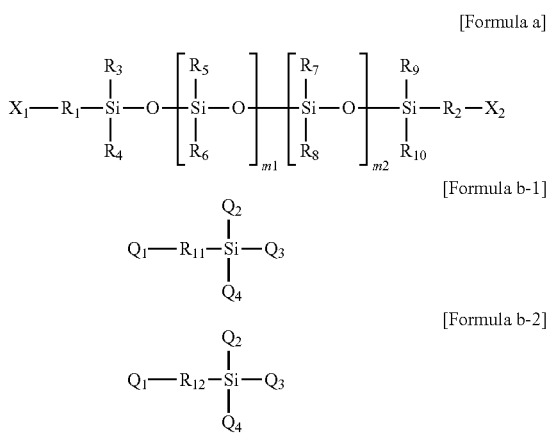

In the formulas a, b-1 and b-2, $X_1$ and $X_2$ are each independently selected from an anhydride group, an amine group, a carboxyl group and an ester group, $R_1$, $R_2$, $R_{11}$ and $R_{12}$ are each independently a single bond or an organic group having 1 to 20 carbon atoms, $R_3$ to $R_{10}$ are each independently an aliphatic group having 1 to 3 carbon atoms or an aromatic group having 6 to 12 carbon atoms, and m1 and m2 are each independently an integer of 0 or more.

According to one embodiment, the formula b-1 and formula b-2 may be represented by the following formula b.

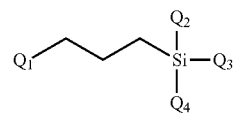

In the formula b, $Q_1$, $Q_2$, $Q_3$ and $Q_4$ are as defined for the formula b-1 and formula b-2.

According to another aspect of the present invention, there is provided a polyimide precursor composition comprising the siloxane compound as described above and a polyamic acid.

According to one embodiment, the polyimide precursor composition may comprise the siloxane compound in an amount of 1 to 15% by weight based on the total weight of the polyimide precursor composition.

Further, the present invention provides a polyimide film produced from the polyimide precursor composition.

According to one embodiment, the polyimide film may have a residual stress of 35 MPa or less with respect to an inorganic substrate.

According to one embodiment, the polyimide film may have a Real Bow value of 35 µm or less.

According to one embodiment, the retardation in the thickness direction of the polyimide film may be 420 nm or less.

The present invention also provides a display substrate comprising the polyimide film.

Effect of the Invention

The present invention provides a novel siloxane compound and provides a polyimide precursor composition having improved storage stability by comprising the siloxane compound in a monomolecular form to the polyimide precursor composition containing a polyamic acid. From this, it is possible to provide a multifunctional polyimide film having improved optical isotropic properties and reduced residual stress with respect to the substrate, and having improved adhesion to the inorganic substrate.

BRIEF DESCRIPTION OF THE DRAWINGS

FIG. 1 is a $^1$H-NMR spectrum of the siloxane compound synthesized according to Example 1.
FIG. 2 is a COSY NMR (Correlation Spectroscopy Nuclear Magnetic Resonance) spectrum of the siloxane compound synthesized according to Example 1.
FIG. 3 is a $^1$H-NMR spectrum of the siloxane compound synthesized according to Example 2.
FIG. 4 is a COSY NMR spectrum of the siloxane compound synthesized according to Example 2.
FIG. 5 is a $^1$H-NMR spectrum of the siloxane compound synthesized according to Example 3.
FIG. 6 is a COSY NMR spectrum of the siloxane compound synthesized according to Example 3.
FIG. 7 is a $^1$H-NMR spectrum of the siloxane compound synthesized according to Example 4.
FIG. 8 is a COSY NMR spectrum of the siloxane compound synthesized according to Example 4.
FIG. 9 is a photograph showing the haze phenomenon of the polyimide precursor composition depending on the amount of the siloxane compound to be added.
FIG. 10 is a collection of photographs showing the haze phenomenon depending on the amount of the siloxane compound added in the polyimide precursor composition coated on the a-Si substrate.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the present disclosure, all compounds or organic groups may be substituted or unsubstituted, unless otherwise specified. Herein, the term "substituted" means that at least one hydrogen contained in the compound or the organic group is substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

The most important factor in the flexible display process is substrate materials of organic materials, which replace the glass substrate that can be processed at a high temperature. As substrate materials of organic materials, polyimide which has excellent heat resistance among organic materials is widely used.

However, there is a tendency that device characteristics are changed after the panel process by replacing the glass substrate with the polyimide substrate, which may result from the difference in moisture permeability and electrical characteristics between organic materials and inorganic materials.

In order to improve such a phenomenon, the substrate may be fabricated in a multilayer form or by forming an inorganic layer between the organic layer and the organic layer. That is, a method of coating and hardening polyimide on a carrier substrate, depositing an inorganic layer, and coating and curing polyimide thereon is used.

However, adhesive strength between the inorganic layer and the different layer such as the polyimide layer tends to be generally low. In the method of manufacturing a substrate by the above-described double curing method, a lift-off phenomenon may occur during the process due to a decrease in adhesion between the organic layer and the inorganic layer.

Therefore, in order to carry out the subsequent process, it is essential to improve the adhesion between the different layers. In order to improve adhesion between different layers, a method of introducing an additive capable of acting as a bridge between different layers has been used. However, in case a reactive additive is introduced, a side reaction with a polyamic acid may occur. As a result, the viscosity of the solution may be changed and the storage stability of the polyamic acid solution may be deteriorated.

In order to solve the problems of prior art, the present invention provides a siloxane compound represented by the following formula 1 or formula 2.

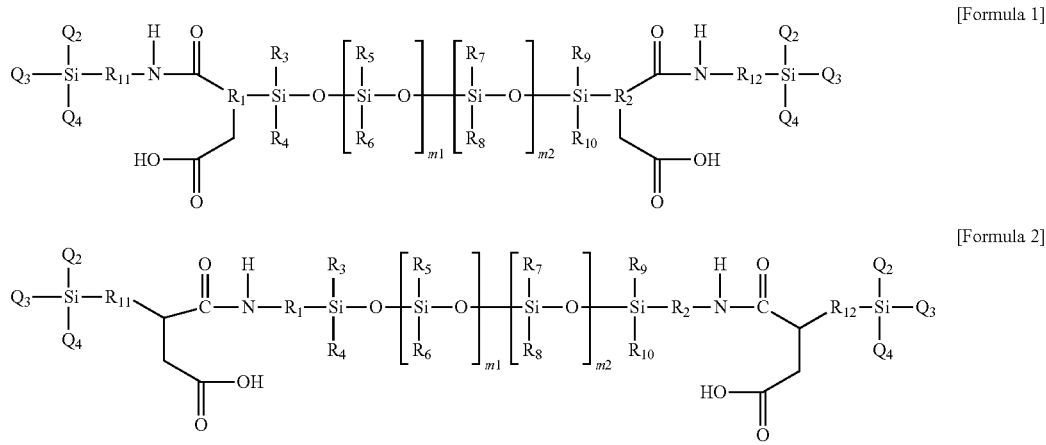

[Formula 1]

[Formula 2]

In formulas 1 and 2, $Q_2$, $Q_3$ and $Q_4$ are each independently selected from a hydrogen atom, an alkyl group having 1 to 5 carbon atoms, and an alkoxy group having 1 to 5 carbon atoms, $R_1$, $R_2$, $R_{11}$ and $R_{12}$ are each independently a single bond or an organic group having 1 to 20 carbon atoms, for example a single bond or an alkylene group having 1 to 20 carbon atoms, preferably a single bond or an alkylene group having 1 to 10 carbon atoms, more preferably a single bond or an alkylene group having 1 to 5 carbon atoms, $R_3$ to $R_{10}$ are each independently an aliphatic group having 1 to 3 carbon atoms or an aromatic group having 6 to 12 carbon atoms, preferably at least one of $R_3$ to $R_{10}$ may be an aromatic group having 6 to 12 carbon atoms, and m1 and m2 are each independently an integer of 0 or more, preferably an integer of 1 or more.

According to one embodiment, the molecular weight of the siloxane compound of formula 1 or formula 2 may be 10000 or less, preferably 8000 or less, more preferably 6000 or less, and may be 1000 to 10000, for example.

The siloxane compound having the structure of formula 1 or formula 2 according to the present invention has no reactivity with polyamic acid which is a polyimide precursor, and thus can provide a polyimide precursor composition having improved storage stability at room temperature.

The siloxane compound according to the present invention can be prepared by reacting a compound of the following formula with a compound of the following formula b-1 and formula b-2.

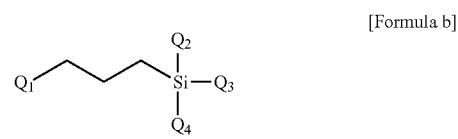
[Formula a]

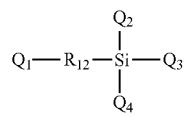
[Formula b-1]

[Formula b-2]

The compounds of the above formula b-1 and formula b-2 may be the same, for example, may be the compound of the following formula b.

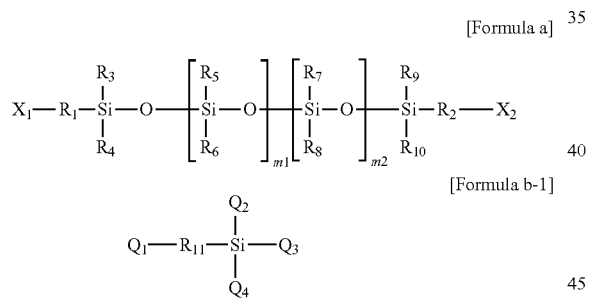
[Formula b]

In formulas a, b-1, b-2 and b, $X_1$ and $X_2$ are each independently selected from an anhydride group, an amine group, a carboxyl group and an ester group, $R_1$ and $R_2$ are each independently a single bond or an organic group having 1 to 20 carbon atoms, for example a single bond or an alkylene group having 1 to 20 carbon atoms, preferably a single bond or an alkylene group having 1 to 10 carbon atoms, more preferably a single bond or an alkylene group having 1 to 5 carbon atoms, $R_3$ to $R_{10}$ are each independently an aliphatic group having 1 to 3 carbon atoms or an aromatic group having 6 to 12 carbon atoms, for example at least one of $R_3$ to $R_{10}$ may be an aromatic group having 6 to 12 carbon atoms, m1 and m2 are each independently an integer of 0 or more, preferably an integer of 1 or more, Q1 is selected from an amine group, an isocyanate group, and an anhydride group, and may preferably be selected from an amine group and an anhydride group, and $Q_2$, $Q_3$ and $Q_4$ are each independently selected from a hydrogen atom, an alkyl group having 1 to 5 carbon atoms, and an alkoxy group having 1 to 5 carbon atoms.

According to one embodiment, the compound of formula 1 may be a compound represented by formula 1-1, and the compound of formula 2 may be a compound represented by formula 2-1.

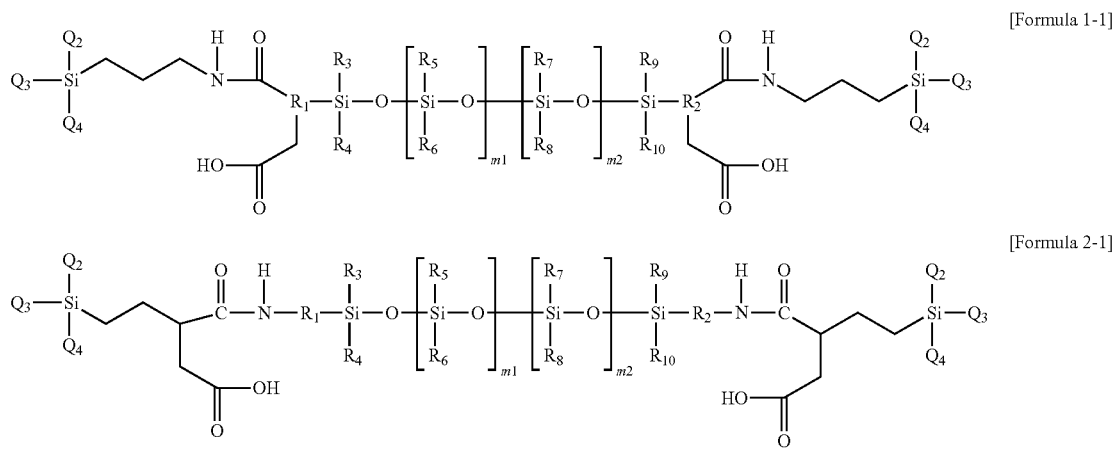
[Formula 1-1]

[Formula 2-1]

The present invention provides a polyimide precursor composition comprising the siloxane compound.

The present invention can provide a polyimide precursor composition having improved storage stability at room temperature, by providing a polyimide precursor composition to which a siloxane compound that does not react with a polyamic acid that is a polyimide precursor is added. For example, when the polyimide precursor composition is allowed to stand at room temperature for 5 days, the viscosity change may be 10% or less. That is, since no side reaction occurs between the polyamic acid and the siloxane compound, the viscosity of the composition hardly changes and the storage stability of the solution can be improved.

Further, by using the siloxane compound according to the present invention as an adhesion promoter of a polyimide film, it is possible to improve the adhesion between the polyimide film and the inorganic substrate. From this, it is possible to reduce a lift-off phenomenon due to the decrease in the adhesion between the inorganic substrate and the polyimide film in the subsequent process of the panel process. Also, the siloxane compound according to the present invention can exhibit optical isotropic properties by decreasing the retardation in the thickness direction of the polyimide film, and can reduce the residual stress with respect to the inorganic substrate.

According to one embodiment, the siloxane compound may be added to the polyimide resin composition in an amount of 0.5 to 15 wt %, preferably 1 to 10 wt %, more preferably 1 to 5 wt % based on the total weight of the polyimide resin composition. When the siloxane compound is added in an amount of less than 0.5 wt %, the effect of improving the adhesion may not be exhibited. When the siloxane compound is added in an amount exceeding 15 wt %, haze may increase.

According to one embodiment, the polyimide film produced from the polyimide precursor composition may have a residual stress of 35 MPa or less with respect to an inorganic substrate and a Real Bow value which indicates glass stress may be 35 μm or less. Therefore, the warpage phenomenon of the substrate after coating-curing can be reduced and a flat polyimide film can be provided.

According to one embodiment, the retardation in the thickness direction of the polyimide film may be 420 nm or less.

The polyimide precursor may comprise a polyamic acid prepared by reacting at least one tetracarboxylic dianhydride and at least one diamine.

The tetracarboxylic dianhydride which can be used in the production of the polyamic acid according to the present invention is at least one selected from tetracarboxylic dianhydrides containing a tetravalent organic group selected from an aliphatic group, an alicyclic group or an aromatic group, or a combination thereof, wherein the aliphatic, alicyclic or aromatic group is connected to each other via a single bond or a crosslinking group, preferably a tetravalent organic group selected from a monocyclic or polycyclic aromatic group, a monocyclic or polycyclic alicyclic group, or a combination of two or more thereof in a molecular structure.

For example, the tetracarboxylic dianhydride may comprise a tetravalent organic group selected from the group consisting of the following formulas 4a to 4g.

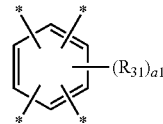
[Formula 4a]

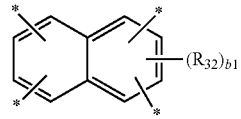
[Formula 4b]

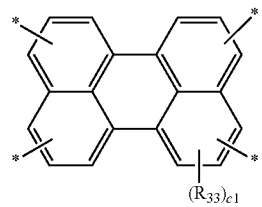
[Formula 4c]

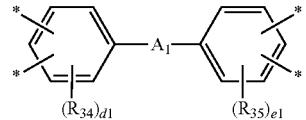
[Formula 4d]

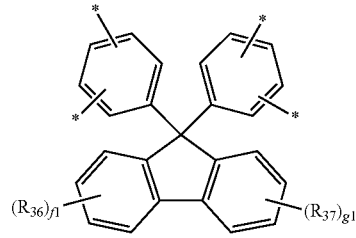
[Formula 4e]

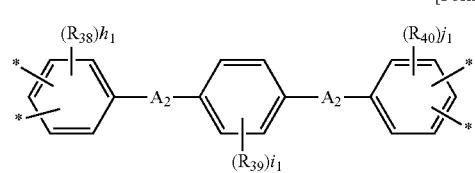
[Formula 4f]

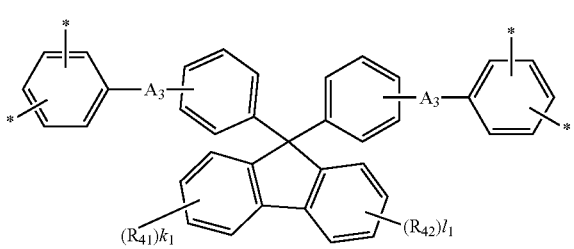
[Formula 4g]

In formulas 4a to 4g, $R_{31}$ to $R_{42}$ may be each independently an alkyl group having 1 to 10 carbon atoms (e.g., a methyl group, an ethyl group, a propyl group, an isopropyl group, a t-butyl group, a pentyl group, a hexyl group etc.) or a fluoroalkyl group having 1 to 10 carbon atoms (e.g., a fluoromethyl group, a perfluoroethyl group, a trifluoromethyl group, etc.)

$a_1$ is an integer of 0 to 2, bi is an integer of 0 to 4, $c_1$ is an integer of 0 to 8, $d_1$ and $e_1$ are each independently an integer of 0 to 3, $f_1$ and $g_1$ are each independently an integer of 0 to 4, $h_1$ and $j_1$ are each independently an integer of 0 to 3, $i_1$ is an integer of 0 to 4, and $k_1$ and $l_1$ are each independently an integer of 0 to 4, and $A_1$, $A_2$ and $A_3$ may be each independently selected group the group consisting of —O—, —CR$_{46}$R$_{47}$—, —C(=O)—, —C(=O)O—, —C(=O)NH—, —S—, —SO$_2$—, a phenylene group and a combination thereof, wherein $R_{46}$ and $R_{47}$ are each independently selected from the group consisting of a hydrogen atom, an alkyl group having 1 to 10 carbon atoms (e.g., a methyl group, an ethyl group, a propyl group, an isopropyl group, a t-butyl group, a pentyl group, a hexyl group, etc.) and a fluoroalkyl group having 1 to 10 carbon atoms (e.g., a flouromethyl group, a fluoroethyl group, a trifluoromethyl group, etc.).

Alternatively, the tetracarboxylic dianhydride may comprise a tetravalent organic group selected from the following formulas 5a to 5s.

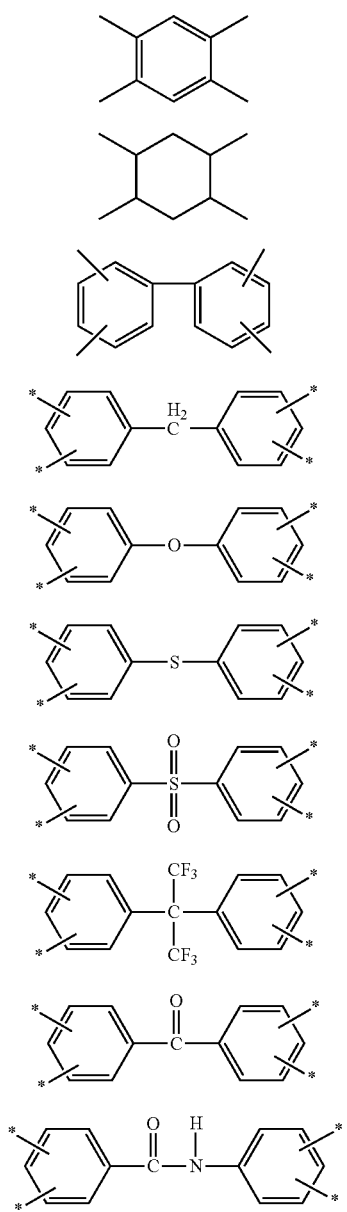

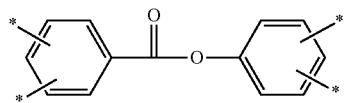

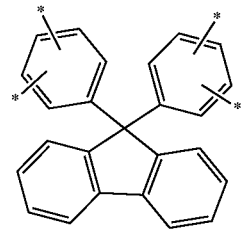

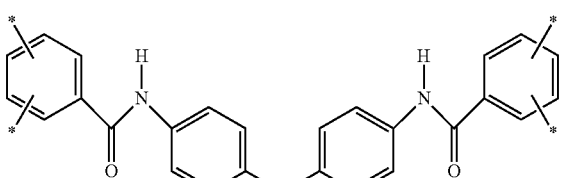

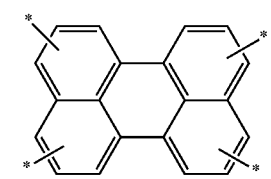

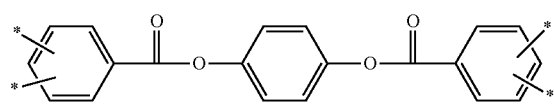

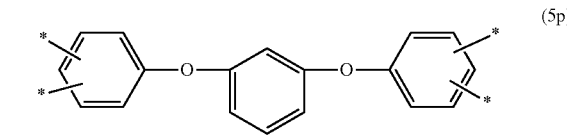

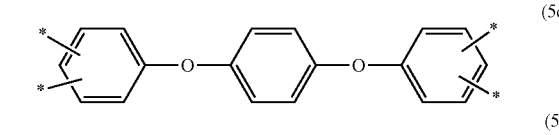

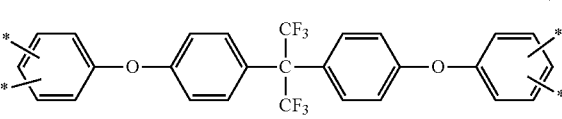

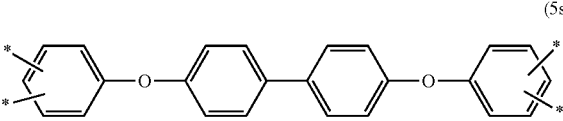

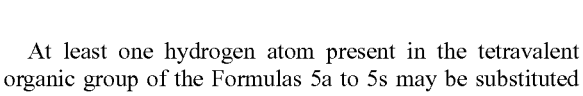

At least one hydrogen atom present in the tetravalent organic group of the Formulas 5a to 5s may be substituted with a substituent selected from an alkyl group having 1 to 10 carbon atoms (e.g., a methyl group, an ethyl group, a propyl group, an isopropyl group, a t-butyl group, a pentyl group, a hexyl group, etc.) or a fluoroalkyl group having 1 to 10 carbon atoms (e.g., a flouromethyl group, a perfluoroethyl group, a trifluoromethyl group, etc.), a hydroxyl group, a sulfonic group and a carboxylic group.

The diamine which can be used in the production of the polyamic acid according to the present invention is at least one selected from diamines containing a divalent organic group selected from an aliphatic group, an alicyclic group or an aromatic group, or a combination thereof, wherein the aliphatic, alicyclic or aromatic group is connected to each other via a single bond or a crosslinking group, preferably a divalent organic group selected from a monocyclic or polycyclic aromatic group, a monocyclic or polycyclic alicyclic group, or a combination of two or more thereof in a molecular structure.

For example, the diamine according to the present invention may comprise a divalent organic group selected from the following formulas 6a to 6d.

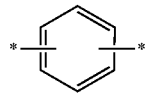

[Formula 6a]

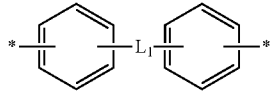

[Formula 6b]

In the formula 6b, $L_1$ is a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and $n_1$, $n_2$ and $n_3$ are each independently an integer of 1 to 10.

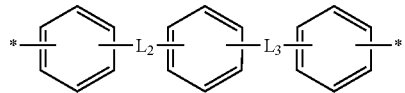

[Formula 6c]

In the formula 6c, $L_2$ and $L_3$, which may be the same or different from each other, are each a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and $n_1$, $n_2$ and $n_3$ are each independently an integer of 1 to 10.

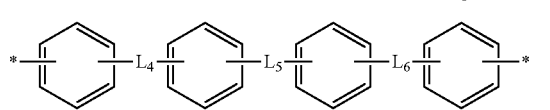

[Formula 6d]

In the formula 6d, $L_4$, $L_5$ and $L_6$, which may be the same or different from each other, are each a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and $n_1$, $n_2$ and $n_3$ are each independently an integer of 1 to 10.

Alternatively, the diamine may comprise a divalent organic group selected from the following formulas 7a to 7r.

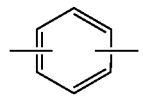
(7a)

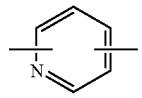
(7b)

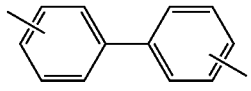
(7c)

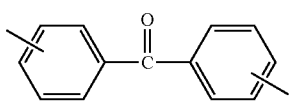
(7d)

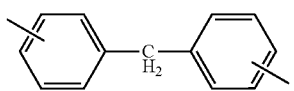
(7e)

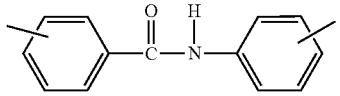
(7f)

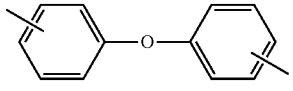
(7g)

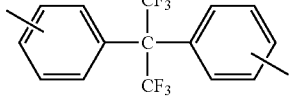
(7h)

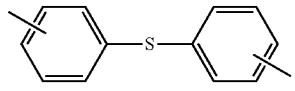
(7i)

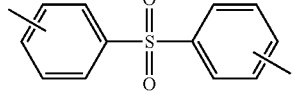
(7j)

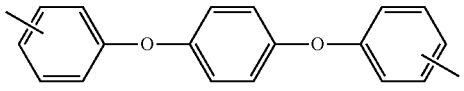
(7k)

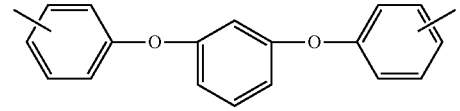
(7l)

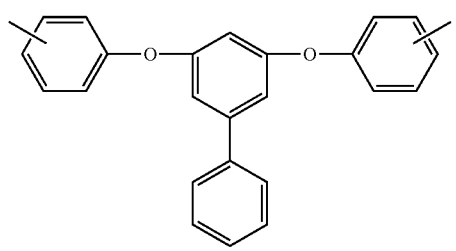
(7m)

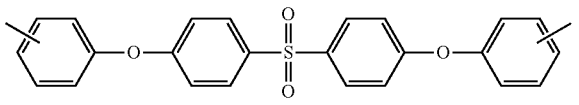
(7n)

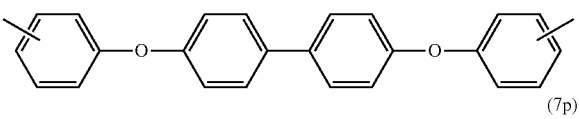
(7o)

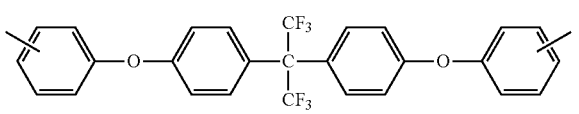
(7p)

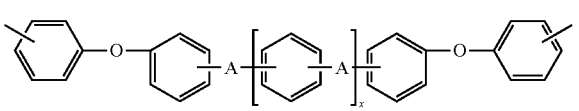
(7q)

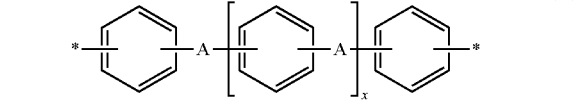
(7r)

In the formulas 7q and 7r, A is a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and v and z are each independently 0 or 1.

In addition, at least one hydrogen atom present in the divalent organic group of the formulas 7a to 7r may be substituted with a substituent selected from a halogen atom selected from the group consisting of —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms.

According to one embodiment, the diamine may comprise at least one diamine containing a divalent organic group represented by the following formula 8 in a molecular structure.

[Formula 8]

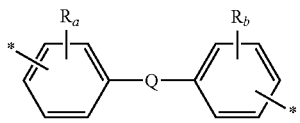

In the formula 8, R$_a$ and R$_b$ are each independently a substituent from a hydrogen atom, a halogen atom selected from the group consisting of —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, preferably a substituent from a halogen atom, a halogenoalkyl group, an alkyl group, an aryl group and a cyano group. For example, the halogen atom may be fluoro (—F), the halogenoalkyl group may be a fluoroalkyl group having 1 to 10 carbon atoms containing a fluoro atom, such as a fluoromethyl group, a perfluoroethyl group, a trifluoromethyl group and the like, and the alkyl group may be a methyl group, an ethyl group, a propyl group, an isopropyl group, a t-butyl group, a pentyl group, a hexyl group, and the aryl group may be selected from a phenyl group and a naphthalenyl group, more preferably a fluoro atom or a substituent containing a fluoro atom such as a fluoroalkyl group.

Q may be selected from the group consisting of a single bond, —O—, —CR'R''—, —C(=O)—, —C(=O)O—, —C(=O)NH—, —S—, —SO$_2$—, a phenylene group and a combination thereof, wherein R' and R'' are each independently selected from the group consisting of a hydrogen atom, an alkyl group having 1 to 10 carbon atoms and a fluoroalkyl group having 1 to 10 carbon atoms.

Herein, the "fluoro-based substituent" of the present invention means "a fluoro atom substituent" as well as "a substituent containing a fluoro atom".

According to one embodiment, the tetracarboxylic dianhydride may contain a tetracarboxylic dianhydride having a structure represented by the following formula 9 in an amount of 10 mol % or more of the total tetracarboxylic dianhydride, preferably 30 mol % or more.

[Formula 9]

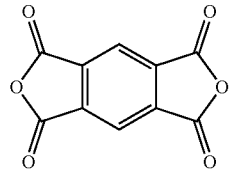

According to one embodiment of the present invention, the tetracarboxylic dianhydride and the diamine may be reacted in a molar ratio of 1:1.1 to 1.1:1. In order to improve reactivity and processability, it is preferred that the total content of the tetracarboxylic dianhydride is excessive relative to the diamine, or the content of the diamine is excessive relative to the total content of the tetracarboxylic dianhydride.

According to one embodiment of the present invention, it is preferable that the molar ratio of the total content of the tetracarboxylic dianhydride to the content of the diamine is 1:0.98 to 0.98:1, preferably 1:0.99 to 0.99:1.

In addition, the organic solvent that can be used in the polymerization reaction may be selected from the group consisting of ketones such as γ-butyrolactone, 1,3-dimethyl-2-imidazolidinone, methyl ethyl ketone, cyclohexanone, cyclopentanone and 4-hydroxy-4-methyl-2-pentanone; aromatic hydrocarbons such as toluene, xylene and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether and triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N-methylpyrrolidone (NMP), N-ethylpyrrolidone (NEP), N,N-dimethylmethoxyacetamide, dimethylsulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether, Equamide M100, Equamide B100 and the like, and these solvents may be used alone or as a mixture of two or more.

For example, the organic solvent that can be used in the polymerization reaction may have a positive distribution coefficient (Log P value) at 25° C. and a boiling point of 300° C. or less. More specifically, the partition coefficient, Log P value may be 0.01 to 3, or 0.01 to 2, or 0.1 to 2.

The distribution coefficient can be calculated using an ACD/Log P module of ACD/Percepta platform from ACD/Labs. The ACD/Log P module uses an algorithm based on QSPR (Quantitative Structure-Property Relationship) methodology using 2D molecular structures.

The solvent having a positive distribution coefficient (Log P) may be an amide-based solvent and the amide-based solvent may be at least one selected from the group consisting of dimethylpropionamide (DMPA), diethylpropionamide (DEPA), N,N-diethylacetamide (DEAc), N,N-diethylformamide (DEF) and N-ethylpyrrolidone (NEP).

An organic solvent having a positive distribution coefficient can reduce white turbidity due to phase separation from polarity difference between the flexible polyimide repeating structure and other polyimide structure. Conventionally, two kinds of organic solvents have been used in order to solve the phase separation problem. However, the present invention can reduce white turbidity due to phase separation even using one kind of organic solvent, so that a more transparent polyimide film can be produced.

There is a method in which a polar solvent and a non-polar solvent are mixed to solve white turbidity problem. However, since a polar solvent has high volatility, it may be volatilized in advance during the production process, which may cause problems such as deterioration of process reproducibility. In addition, the problem of phase separation may not be completely solved and it results in high haze and low transparency of the produced polyimide film. More specifically, by using a solvent containing an amphipathic molecular structure, it is possible to solve the process problem due to use of a polar solvent. Also, even if only one kind of solvent is used, due to the amphipathic molecular structure, the polyimide can be uniformly distributed and is suitable for solving the problem caused by phase separation. As a result, polyimide having significantly improved haze characteristics can be provided.

The positive distribution coefficient value means that the polarity of solvent is hydrophobic. According to the studies of the present inventors, if a specific solvent having a positive distribution coefficient (Log P) value is used to prepare a polyimide precursor composition, dewetting phenomenon of the solution can be improved. Further, by using a solvent having a positive Log P value, it is possible to control dewetting phenomenon of the solution without using additives for controlling a surface tension or a smoothness of the coating film, such as a leveling agent. Since an additional material such as an additive is not used, it is possible to eliminate problems of quality and process such as inclusion of a low-molecular substance in a final product, and to form a polyimide film having uniform properties more efficiently.

For example, in the process of coating a polyimide precursor composition on a glass substrate, dewetting of the solution may be occurred due to shrinkage of the coating layer during curing or leaving under humidity condition of the coating solution. This dewetting phenomenon of the coating solution leads to a variation in the film thickness, resulting in insufficient bending resistance of the film. Therefore, film breakage may occur or edge cracking may appear when cutting. That is, there may be problems of poor processability and lowered yield.

If polar fine foreign substances are introduced to the polyimide precursor solution containing a polar solvent having a negative Log P, which is coated on the substrate, the polarity of the foreign substances may cause sporadic coating cracks or thickness change around the portions where the foreign substances exist. On the contrary, when a hydrophobic solvent having a positive log P is used, coating cracks, thickness changes, or the like can be reduced or suppressed even when polar fine foreign substances are introduced.

Specifically, the polyimide precursor composition comprising a solvent having a positive Log P may have a dewetting ratio of 0% to 0.1% or less as defined by the following Equation 1:

$$\text{Dewetting ratio (\%)} = [(A-B)/A] \times 100 \qquad \text{[Equation 1]}$$

In Equation 1,
A: area measured when the polyimide precursor composition is fully coated on a substrate (100 mm×100 mm),
B: area measured after dewetting phenomenon occurs from the end of edge of a substrate coated with polyimide precursor composition or PI film.

The dewetting phenomenon of the polyimide precursor composition and the film may occur within 30 minutes after coating the solution of the polyimide precursor composition. In particular, the edges are thickened by starting of dewetting from edges.

After coating the substrate with the polyimide precursor composition according to the present invention and then leaving in a humidity condition for 10 minutes or more, for example, 10 minutes or more, for example, 40 minutes or more, the dewetting ratio is 0.1% or less. For example, even after leaving at a temperature of 20 to 30° C. and under a humidity condition of 40% or more, more specifically a humidity condition of 40% to 80%, that is, 40%, 50%, 60%, 70%, 80%, for example a humidity condition of 50% for 10 to 50 minutes, a very low dewetting ratio of 0.1% or less may be exhibited, preferably 0.05%, more preferably nearly 0%.

The above dewetting ratio is maintained even after curing. For example, after the polyimide precursor composition is coated on the substrate and then left for 10 minutes or more, for example, at a temperature of 20 to 30° C. and under a humidity condition of 40% or more, more specifically a humidity condition of 40% to 80%, that is, 40%, 50%, 60%, 70%, 80%, for example a humidity condition of 50% for 10 to 50 minutes, the dewetting ratio of the cured polyimide film may be 0.1% or less, that is, the dewetting can be hardly occurred or can be disappeared even in the curing process by heat treatment, and specifically 0.05%, more preferably nearly 0%.

The polyimide precursor composition according to the present invention can solve this dewetting phenomenon, thereby making it possible to obtain a polyimide film having more uniform characteristics and further improve the yield of the production process.

The reaction of tetracarboxylic dianhydride and diamine may be carried out by a conventional polymerization method of polyimide precursor, such as solution polymerization. Specifically, diamine is dissolved in an organic solvent and then is subjected to a polymerization reaction by adding tetracarboxylic dianhydride.

The polymerization reaction may be carried out in an inert gas or a nitrogen stream, and may be carried out under anhydrous conditions.

The reaction temperature during the polymerization reaction may be −20 to 80° C., preferably 0 to 80° C. If the reaction temperature is too high, the reactivity may become high and the molecular weight may become large, and the viscosity of the precursor composition may increase, which may be unfavorable in the process.

It is preferred that the polyimide precursor composition contains a solid content in an amount such that the composition has an appropriate viscosity in consideration of processability such as coating properties during a film-forming step. According to one embodiment, the content of the composition may be adjusted so that the total content of polyimide precursor is from 8 to 25% by weight, preferably from 10 to 25% by weight, more preferably from 10 to 20% by weight or less.

Alternatively, the polyimide precursor composition may be adjusted to have a viscosity of 3,000 cP or more, or 4,000 cP or more. The viscosity of the polyimide precursor composition is 10,000 cP or less, preferably 9,000 cP or less, more preferably 8,000 cP or less. When the viscosity of the polyimide precursor composition exceeds 10,000 cP, the efficiency of defoaming during processing the polyimide film is lowered. It results in not only the lowered efficiency of process but also the deteriorated surface roughness of the produced film due to bubble generation. It may lead to the deteriorated electrical, optical and mechanical properties.

The polyimide according to the present invention may have a weight average molecular weight of 10,000 to 200,000 g/mol, or 20,000 to 100,000 g/mol, or 30,000 to 100,000 g/mol. The molecular weight distribution (Mw/Mn) of the polyimide according to the present invention is preferably 1.1 to 2.5. When the weight average molecular weight or the molecular weight distribution of the polyimide is out of the above range, film formation may be difficult or the properties of polyimide film such as transmittance, heat resistance and mechanical properties may be deteriorated.

Then, the obtained polyimide precursor as a result of the polymerization reaction may be imidized to prepare a transparent polyimide film. At this time, the imidization process may be specifically a chemical imidization or thermal imidization process.

For example, after adding a dehydrating agent and an imidization catalyst to a polymerized polyimide precursor composition, the polymerized polyimide precursor composition is heated at a temperature of 50 to 100° C. and imidized by a chemical reaction, or the solution is refluxed to remove an alcohol and imidized to obtain polyimide.

In the chemical imidization method, pyridine, triethylamine, picoline or quinoline may be used as an imidization catalyst. In addition, a substituted or unsubstituted nitrogen-containing heterocyclic compound, an N-oxide compound of the nitrogen-containing heterocyclic compound, a substituted or unsubstituted amino acid compound, an aromatic hydrocarbon compound having a hydroxyl group or an aromatic heterocyclic compound, and particularly, lower alkylimidazole such as 1,2-dimethylimidazole, N-methylimidazole, N-benzyl-2-methylimidazole, 2-methylimidazole, 2-ethyl-4-methylimidazole and 5-methylbenzimidazole, imidazole derivative such as N-benzyl-2-methyl imidazole, isoquinoline, substituted pyridine such as, 3,5-dimethylpyridine, 3,4-dimethylpyridine, 2,5-dimethylpyridine, 2,4-dimethylpyridine and 4-n-propylpyridine, and p-toluenesulfonic acid, may be used.

As the dehydrating agent, an acid anhydride such as acetic anhydride may be used.

Alternatively, the polyimide precursor composition may be coated on a substrate and heat treated to be imidized.

The polyimide precursor composition may be in the form of a solution in which the polyimide precursor is dissolved in an organic solvent. For example, when the polyimide precursor is synthesized in an organic solvent, the solution may be the reaction solution as obtained, or may be obtained by diluting this reaction solution with another solvent. When the polyimide precursor is obtained as a solid powder, it may be dissolved in an organic solvent to prepare a solution.

The present invention provides a polyimide precursor composition comprising at least one siloxane compound represented by formula 1 or formula 2 in the polyimide precursor solution.

According to one embodiment, the siloxane compound may be added to the polyimide precursor composition in an amount of 0.5 to 15 wt %, preferably 1 to 10 wt %, more preferably 1 to 5 wt %, based on the total weight of the polyimide precursor composition. When the siloxane compound is added in an amount of less than 0.5% by weight, the adhesive strength may not be improved. When the siloxane compound is added in an amount exceeding 15% by weight, haze may occur.

The present invention provides a method for producing a polyimide film comprising the steps of:
applying the polyimide precursor composition onto a substrate; and
heat treating the applied polyimide precursor composition.

As the substrate, a glass substrate, a metal substrate, a plastic substrate, or the like can be used without any particular limitation. Among them, a glass substrate may be preferable which is excellent in thermal and chemical stability during the imidization and curing process for the polyimide precursor and can be easily separated even without any treatment with additional release agent while not damaging the polyimide film formed after curing.

The applying process may be carried out according to a conventional application method. Specifically, a spin coating method, a bar coating method, a roll coating method, an air knife method, a gravure method, a reverse roll method, a kiss roll method, a doctor blade method, a spray method, a dipping method, a brushing method, or the like may be used. Of these, it is more preferable to carry out by a casting method which allow a continuous process and enables to increase an imidization rate of polyimide.

In addition, the polyimide precursor composition may be applied on the substrate in the thickness range such that the polyimide film to be finally produced has a thickness suitable for a display substrate. Specifically, it may be applied in an amount such that the thickness is 10 to 30 μm.

After the application of the polyimide precursor composition, a drying process for removing the solvent remained in the polyimide precursor composition may be further optionally performed prior to the curing process.

The drying process may be carried out according to a conventional method. Specifically, the drying process may be carried out at a temperature of 140° C. or lower, or from 80° C. to 140° C. If the drying temperature is lower than 80° C., the drying process becomes longer. If the drying temperature exceeds 140° C., the imidization proceeds rapidly, making it difficult to form a polyimide film having a uniform thickness.

Then, the polyimide precursor composition is applied on a substrate and heat-treated in an IR oven, in a hot air oven, or on a hot plate. The heat treatment temperature may range from 300 to 500° C., preferably from 320 to 480° C. The heat treatment may be performed in a multi-step heating process within the above temperature range. The heat treatment process may be performed for 20 to 70 minutes, and preferably for 20 to 60 minutes.

Thereafter, the polyimide film formed on the substrate may be peeled off from the substrate according to a conventional method, resulting in a polyimide film.

The organic solvent contained in the polyimide precursor composition of the present invention may be the same as the organic solvent used in the polymerization reaction.

In the present invention, a silane coupling agent, a crosslinkable compound, an imidization accelerator for promoting imidization efficiently, and the like may be added as long as the effect is not impaired.

The present invention provides a display substrate comprising a polyimide film produced from the polyimide precursor composition.

According to one embodiment, the polyimide film may have a haze of 2 or less, preferably 1 or less, or 0.9 or less, thereby providing a transparent colorless polyimide film. At this time, the thickness of the polyimide film may be 8 to 15 μm, preferably 10 to 12 μm.

Also, it may be a transparent colorless polyimide film having a transmittance to light at a wavelength of 380 to 760 nm of 80% or more at a film thickness of 5 to 30 μm and a yellowness index (YI) of about 15 or less, preferably about 10 or less, more preferably about 8 or less, or 7 or less. With excellent light transmittance and low yellowness as described above, a transparent colorless polyimide film can be provided.

The polyimide film may have a retardation value ($R_{th}$) in the thickness direction of about 1000 nm or less, or 0 to 700 nm, preferably 0 to 600 nm, and more preferably 0 to 500 nm. For example, with $R_{th}$ of 420 nm or less, it is possible to provide a display excellent in visual sensitivity due to less distortion of light.

According to one embodiment, the polyimide film included in the display substrate may be formed on an inorganic substrate.

According to one embodiment, the display substrate may comprise an inorganic substrate containing an inorganic material;

a first polyimide layer formed on the inorganic substrate and comprising the polyimide film;

an inorganic layer formed on the first polyimide film and containing an inorganic material; and an organic-inorganic composite layer formed on the inorganic layer and comprising a second polyimide layer containing the polyimide film.

From the inorganic layer formed between the polyimide films, it is possible to solve the problem of deterioration of the device characteristics due to the difference in moisture permeability and in electrical characteristics of the organic material and the inorganic material.

Further, since the polyimide film according to the present invention is made of the polyimide precursor composition containing the siloxane compound, the adhesion between the inorganic substrate containing the inorganic material and the inorganic layer and the polyimide film can be remarkably increased and the residual stress of the polyimide film can be reduced, thereby solving defects due to a lift-off phenomenon in the panel process.

The polyimide film according to the present invention can be used for a protective film for a circuit substrate, a base film for a circuit substrate, an insulating layer for a circuit substrate, an interlayer insulating film for a semiconductor, a solder resist, a flexible circuit substrate or a flexible display substrate, specifically it is suitable for an OLED device using a low temperature polysilicon (LTPS) which requires a high temperature process, but is not limited thereto.

Hereinafter, embodiments of the present invention will be described in detail so that those skilled in the art can easily carry out the present invention. The present invention may, however, be embodied in many different forms and should not be construed as limited to the embodiments set forth herein.

Example 1

1000 g of DEAc (Diethylacetamide) was charged into a reactor through which nitrogen gas flows, and then 0.121 mol of one-end amine-modified APTEOS ((3-Aminopropyl) triethoxysilane) was added and dissolved while maintaining the temperature of the reactor at 25° C. At the same temperature, 0.06 mol of X-22-168-P5-B (Shin-Etsu Silicone) was added to the solution to which APTEOS was added, and stirred for 24 hours to prepare a siloxane compound 1 having the structure of formula 1.

[Reaction Scheme 1]

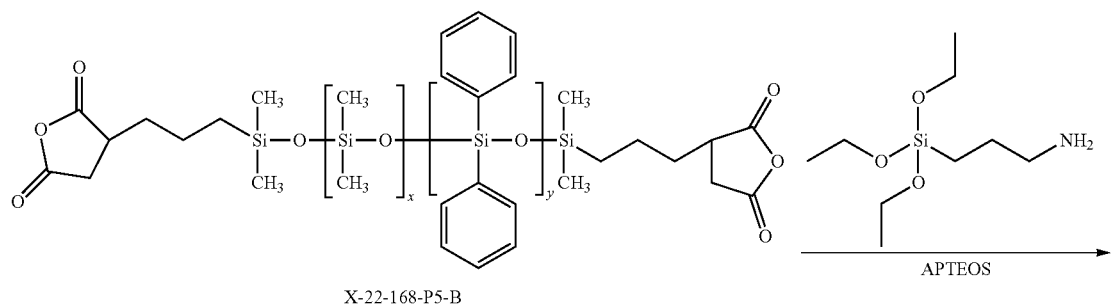

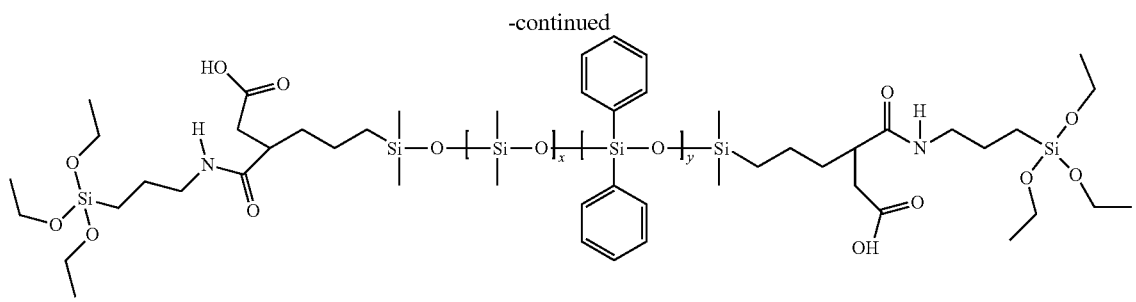

The results of ¹H-NMR and COZY NMR analysis of the siloxane compound 1 are shown in FIG. 1 and FIG. 2, respectively. From the results of ¹H-NMR and COSY NMR analysis, it can be found that the synthesis of amic acid in the reaction scheme 1 proceeded and the siloxane compound 1 was synthesized.

<NMR Measurement Condition>
Instrument
Bruker 700 MHz NMR
Experimental Procedure
Acetone-$d_6$ solvent was placed in an insert tube and the NMR tube was filled with the sample to perform NMR measurement.
Parameter
¹H-NMR
pulse program: zg30, d1: 3.0 sec, ns: 64, temperature: 298K
COSY NMR
pulse program: cosygpppqf, d1: 2.0 sec, ns: 8, temperature: 298K

Example 2

1000 g of DEAc was charged into a reactor through which nitrogen gas flows, and then 0.302 mol of one-end anhydride-modified X-12-967C (Shin-Etsu Silicone) was added and dissolved while maintaining the temperature of the reactor at 25° C. At the same temperature, 0.151 mol of X-22-9409 (Shin-Etsu Silicone) was added to the solution to which X-12-967C was added, and stirred for 24 hours to prepare a siloxane compound 2 having the structure of formula (2).

[Reaction Scheme 2]

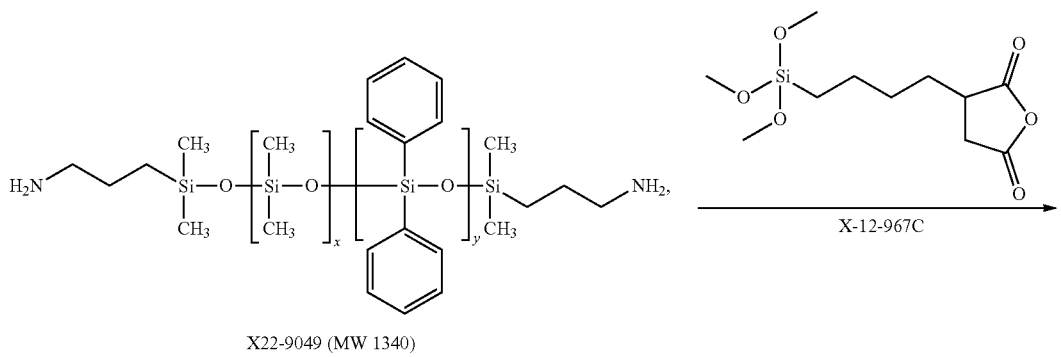

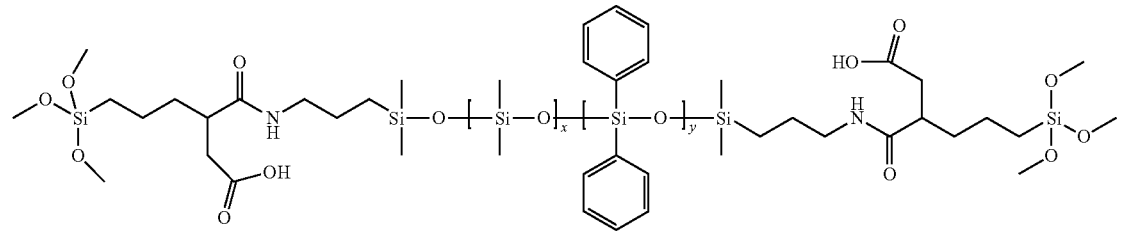

Example 3

A siloxane compound 3 was prepared in the same manner as in Reaction Scheme 2, except that X22-9049 in Example 2 was changed to X22-1660B (MW 4200, Shin-Etsu Silicone).

Example 4

A siloxane compound 4 was prepared in the same manner as in Reaction Scheme 2, except that X22-9049 in Example 2 was changed to X22-9668 (MW 5640).

The results of ¹H-NMR and COZY NMR analysis of the siloxane compounds 2 to 4 are shown in FIG. 3 to FIG. 8, respectively. From the results of ¹H-NMR and COSY NMR analysis, it can be found that the amic acid synthesis reaction of the reaction scheme 2 proceeded and the siloxane compound having the structure of the formula (2) was synthesized.

Preparation Example

PMDA: Pyromellitic Dianhydride
6FDA: 4,4'-(Hexafluoroisopropylidene)diphthalic anhydride
TFMB: 2,2'-bis(trifluoromethyl)benzidine
DDS: 4,4'-Diaminodiphenyl sulfone
BPDA: 3,3',4,4'-Biphenyltetracarboxylic dianhydride Preparation Example 1: PMDA-6FDA-TFMB-DDS (8:2:7:3)

800 g of DEAc was charged into a reactor through which nitrogen gas flows, and then 0.178 mol of TFMB and 0.076 mol of DDS were added and dissolved while maintaining the temperature of the reactor at 25° C. At the same temperature, 0.229 mol of PMDA and 0.025 mol of 6FDA were added to the solution to which TFMB and DDS were added, and stirred for 48 hours to prepare a polyamic acid solution.

Preparation Example 2: PMDA-DDS (1:1)

498 g of DEAc was charged into a reactor through which nitrogen gas flows, and then 0.458 mol of DDS was added and dissolved while maintaining the temperature of the reactor at 25° C. At the same temperature, 0.458 mol of PMDA was added to the solution to which DDS was added, and stirred for 48 hours to synthesize a polyimide precursor. DEAc was added so that the viscosity after polymerization was 3,000 to 4,000 cP, thereby obtaining a polyamic acid solution.

Preparation Example 3: BPDA-DDS (1:1)

430 g of DEAc was charged into a reactor through which nitrogen gas flows, and then 0.339 mol of DDS was added and dissolved while maintaining the temperature of the reactor at 25° C. At the same temperature, 0.339 mol of BPDA was added to the solution to which DDS was added, and stirred for 48 hours to synthesize a polyimide precursor. DEAc was added so that the viscosity after polymerization was 3,000 to 4,000 cP, thereby obtaining a polyamic acid solution.

Preparation Example 4: 6FDA-DDS (1:1)

363 g of DEAc was charged into a reactor through which nitrogen gas flows, and then 0.225 mol of DDS was added and dissolved while maintaining the temperature of the reactor at 25° C. At the same temperature, 0.339 mol of 6FDA was added to the solution to which DDS was added, and stirred for 48 hours to synthesize a polyimide precursor. DEAc was added so that the viscosity after polymerization was 3,000 to 4,000 cP, thereby obtaining a polyamic acid solution.

Preparation Example 5: 6FDA-TFMB (1:1)

715 g of DEAc was charged into a reactor through which nitrogen gas flows, and then 0.339 mol of DDS was added and dissolved while maintaining the temperature of the reactor at 25° C. At the same temperature, 0.339 mol of BPDA was added to the solution to which DDS was added, and stirred for 48 hours to synthesize a polyimide precursor. DEAc was added so that the viscosity after polymerization was 3,000 to 4,000 cP, thereby obtaining a polyamic acid solution.

Experimental Example 5 to 12 and Comparative Examples 1 to 4

Polyimide precursor compositions were prepared by adding the siloxane compounds prepared in Examples 1 to 4 to the polyamic acid solutions prepared in Preparation Examples 1 to 5.

TABLE 1

| Example | Polyamic acid | Siloxane compound | Adding amount |
|---|---|---|---|
| Experimental Example 5 | Preparation Example 1 | Example 3 | 1~10 wt % |
| Experimental Example 6 | Preparation Example 1 | Example 1 | 1~10 wt % |
| Experimental Example 7 | Preparation Example 1 | Example 2 | 1~10 wt % |
| Experimental Example 8 | Preparation Example 1 | Example 4 | 1~10 wt % |
| Experimental Example 9 | Preparation Example 2 | Example 3 | 1~10 wt % |
| Experimental Example 10 | Preparation Example 3 | Example 3 | 1~10 wt % |
| Experimental Example 11 | Preparation Example 4 | Example 3 | 1~10 wt % |
| Experimental Example 12 | Preparation Example 5 | Example 3 | 1~10 wt % |
| Comparative Example 1 | Preparation Example 1 | — | — |
| Comparative Example 2 | Preparation Example 2 | — | — |
| Comparative Example 3 | Preparation Example 3 | — | — |
| Comparative Example 4 | Preparation Example 4 | — | — |
| Comparative Example 5 | Preparation Example 5 | — | — |

Experimental Example

The polyimide precursor compositions of Examples 5 to 12 were evaluated for properties in comparison with the polyimide precursor composition of Comparative Example 1. First, the polyimide precursor compositions were spin-coated on a glass substrate, respectively. The glass substrate coated with the polyimide precursor composition was placed in an oven, heated at a rate of 5° C./min, and cured at 80° C. for 30 minutes and at 400° C. for 30 minutes to prepare a polyimide film. The haze, yellowness index (YI), retardation in the thickness direction (Rth), glass transition temperature (Tg), glass stress (Real Bow), residual stress and peel strength of each polyimide film prepared by the above-described method were measured.

<Haze>
Haze was measured by the method according to ASTM D1003 using a Haze Meter HM-150.
<Yellowness Index (YI)>
Yellowness index (YI) was measured with Color Eye 7000A.
<Retardation in the Thickness Direction>
Retardation in the thickness direction (Rth) was measured with Axoscan. The film was cut to a certain size and the thickness was measured. Then, a retardation value was measured with Axoscan. To compensate the retardation value, the thickness (nm) measured while being corrected in the C-plate direction was input to Axoscan.

<Glass Transition Temperature (Tg)>

The film was cut to 5×20 mm to prepare a sample, and then the sample was loaded using an accessory. A length of the film to be actually measured was equal to 16 mm. A pulling force was set at 0.02 N. The first temperature-rising step was carried out at a heating rate of 5° C./min from 100 to 400° C., then cooling was carried out at a cooling rate of 4° C./min from 400 to 100° C., and the second temperature-rising step was carried out at a heating rate of 5° C./min from 100 to 450° C. The change in the thermal expansion was measured with TMA ($Q_{400}$, TA Company).

At this time, the inflection point shown in the temperature-rising section during the second temperature-rising step was defined as Tg.

<Measurement of Residual Stress>

The polyimide precursor composition was applied on a 6 inch of silicon wafer having a thickness of 525 μm, which has been previously measured for [amount of warpage] of the wafer by using a residual stress meter (FLX2320 of TENCOR), by a spin coater and was cured in an oven (manufactured by Koyo Lindberg) at 250° C. for 30 min and at 400° C. for 60 min in a nitrogen atmosphere. A silicon wafer with a resin film having a thickness of 10 μm after curing was produced. At this time, the amount of warpage of the wafer is expressed as a Real Bow value measured by a residual stress meter, and the residual stress generated between the silicon wafer and the resin film was measured.

<Peel Strength Measurement>

The polyimide precursor compositions prepared in Examples and Comparative Example 1 were spin-coated on a glass substrate on which a-Si was deposited to have 10 μm of a final thickness after curing. The glass substrate coated with the polyimide precursor solution was placed in an oven, heated at a rate of 4° C./min, and cured at 250° C. for 30 minutes and at 410° C. for 60 minutes. The peel strength was measured by peeling the sample having a film width of 2.54 cm and a measurement length of 10 mm at 10 mm/sec at 180° C., using a peel strength analyzer (TA-XT Plus, Texture Analyzer).

Measurement Results

Experimental Example 5

The measurement results of the films prepared using the polyimide precursor compositions of Experimental Example 5 and Comparative Example 1 are shown in Table 2 below.

TABLE 2

| Content of siloxane compound, wt % | 0 (Comp. Exam 1) | 1 | 3 | 5 | 7 | 10 |
|---|---|---|---|---|---|---|
| Thickness, μm | 10 | 10 | 10 | 10 | 10 | 10 |
| YI | 7.3 | 6.8 | 6.6 | 6.3 | 5.9 | 5.7 |
| Rth, nm | 420 | 410 | 392 | 365 | 335 | 298 |
| Real bow, μm | 35.9 | 33.4 | 32.1 | 30.9 | 29.7 | 27.5 |
| Residual stress, MPa | 35.9 | 33.4 | 32.1 | 31.0 | 29.8 | 27.8 |
| Tg @ 450° C. | 425 | 425 | 422 | 415 | 411 | 406 |
| Peel strength, gf/in | 10 | 105 | 150 | 189 | 250 | N.D. |

In the table, N.D. means that measurement was impossible.

In the table, N.D. means that measurement was impossible.

Experimental Example 6

The measurement results of the films prepared using the polyimide precursor compositions of Experimental Example 6 and Comparative Example 1 are shown in Table 3 below.

TABLE 3

| Content of siloxane compound, wt % | 0 (Comp. Exam 1) | 1 | 5 | 10 |
|---|---|---|---|---|
| Thickness, μm | 10 | 10 | 10 | 10 |
| YI | 7.3 | 6.8 | 6.4 | 6.0 |
| Rth, nm | 420 | 408 | 360 | 301 |
| Real bow, μm | 35.9 | 33.7 | 30.2 | 28.4 |
| Residual stress, MPa | 35.9 | 34.1 | 30.2 | 28.6 |
| Tg @ 450° C. | 425 | 415 | 411 | 404 |
| Peel strength, gf/in | 10 | 110 | 194 | N.D. |

Experimental Example 7

The measurement results of the films prepared using the polyimide precursor compositions of Experimental Example 7 and Comparative Example 1 are shown in Table 4 below.

TABLE 4

| Content of siloxane compound, wt % | 0 (Comp. Exam 1) | 1 | 5 | 10 |
|---|---|---|---|---|
| Thickness, μm | 10 | 10 | 10 | 10 |
| YI | 7.3 | 6.5 | 6.2 | 5.9 |
| Rth, nm | 420 | 398 | 355 | 291 |
| Real bow, μm | 35.9 | 32.8 | 28.7 | 26.3 |
| Residual stress, MPa | 35.9 | 32.5 | 28.2 | 25.7 |
| Tg @ 450° C. | 425 | 413 | 408 | 398 |
| Peel strength, gf/in | 10 | 150 | 230 | N.D. |

Experimental Example 8

The measurement results of the films prepared using the polyimide precursor compositions of Experimental Example 8 and Comparative Example 1 are shown in Table 5 below.

TABLE 5

| Content of siloxane compound, wt % | 0 (Comp. Exam 1) | 1 | 5 | 10 |
|---|---|---|---|---|
| Thickness, μm | 10 | 10 | 10 | 10 |
| YI | 7.3 | 7.0 | 6.8 | 6.4 |
| Rth, nm | 420 | 415 | 380 | 320 |
| Real bow, μm | 35.9 | 35.0 | 31.0 | 30.5 |
| Residual stress, MPa | 35.9 | 34.9 | 31.0 | 30.2 |
| Tg @ 450° C. | 425 | 420 | 417 | 410 |
| Peel strength, gf/in | 10 | 92 | 139 | N.D. |

Experimental Example 9

The measurement results of the films prepared using the polyimide precursor compositions of Experimental Example 9 and Comparative Example 2 are shown in Table 6 below.

TABLE 6

| Content of siloxane compound, wt % | 0 (Comp. Exam 2) | 1 | 5 | 10 |
|---|---|---|---|---|
| Thickness, μm | 10 | 10 | 10 | 10 |
| YI | 14.4 | 13.5 | 13.2 | 12.5 |

TABLE 6-continued

| Content of siloxane compound, wt % | 0 (Comp. Exam 2) | 1 | 5 | 10 |
|---|---|---|---|---|
| Rth, nm | 148 | 135 | 123 | 112 |
| Real bow, μm | 44.4 | 42.3 | 40.2 | 35.6 |
| Residual stress, MPa | 44.4 | 42.3 | 40.2 | 35.6 |
| Tg @ 450° C. | N.D. | N.D. | 440 | 425 |
| Peel strength, gf/in | 25 | 180 | N.D | N.D. |

Experimental Example 10

The measurement results of the films prepared using the polyimide precursor compositions of Experimental Example 10 and Comparative Example 3 are shown in Table 7 below.

TABLE 7

| Content of siloxane compound, wt % | 0 (Comp. Exam 3) | 1 | 5 | 10 |
|---|---|---|---|---|
| Thickness, μm | 10 | 10 | 10 | 10 |
| YI | 3.9 | 3.8 | 3.3 | 2.7 |
| Rth, nm | 71.4 | 70.5 | 68.6 | 65.3 |
| Real bow, μm | 45.0 | 44.3 | 41.5 | 37.8 |
| Residual stress, MPa | 45.0 | 44.3 | 41.5 | 37.8 |
| Tg @ 450° C. | 381 1 | 380 | 375 | 368 |
| Peel strength, gf/in | 10 | 187 | N.D | N.D. |

Experimental Example 11

The measurement results of the films prepared using the polyimide precursor compositions of Experimental Example 11 and Comparative Example 4 are shown in Table 8 below.

TABLE 8

| Content of siloxane compound, wt % | 0 (Comp. Exam 4) | 1 | 5 | 10 |
|---|---|---|---|---|
| Thickness, μm | 10 | 10 | 10 | 10 |
| YI | 3.2 | 3.2 | 2.8 | 2.3 |
| Rth, nm | 21 | 20 | 18 | 15 |
| Real bow, μm | 50.4 | 49.1 | 46.5 | 42.2 |
| Residual stress, MPa | 50.4 | 49.1 | 46.5 | 42.2 |
| Tg @ 450° C. | 356 | 355 | 348 | 339 |
| Peel strength, gf/in | 13 | 126 | 260 | N.D. |

Experimental Example 12

The measurement results of the films prepared using the polyimide precursor compositions of Experimental Example 12 and Comparative Example 5 are shown in Table 9 below.

TABLE 9

| Content of siloxane compound, wt % | 0 (Comp. Exam 5) | 1 | 5 | 10 |
|---|---|---|---|---|
| Thickness, μm | 10 | 10 | 10 | 10 |
| YI | 2.7 | 2.7 | 2.1 | 2.0 |
| Rth, nm | 100 | 96 | 87 | 80 |
| Real bow, μm | 44.2 | 42.9 | 41.3 | 39.6 |
| Residual stress, MPa | 44.2 | 42.9 | 41.3 | 39.6 |
| Tg @ 450° C. | 363 | 360 | 357 | 349 |
| Peel strength, gf/in | 53 | 230 | N.D. | N.D. |

As can be seen from the results of Tables 2 to 9, the polyimide films prepared by adding the siloxane compounds of Examples 1 to 4 to the polyamic acid solution prepared in Preparation Examples had a lowered residual stress and Real Bow value as well as a lowered yellowness index, haze value and retardation in the thickness direction. On the other hand, it can be confirmed that the peel strength is much improved as compared with the films of the comparative examples. It indicates that the addition of the siloxane compound improves the adhesion of the polyimide film.

FIG. 9 is a photograph showing the haze change of the polyimide precursor composition (Experimental Example 7) depending on the amount of the siloxane compound to be added, and FIG. 10 is a series of photographs showing the haze phenomenon of the polyimide precursor composition depending on the amount of the siloxane compound after the polyimide precursor composition was coated on the a-Si substrate. As shown in FIG. 9 and FIG. 10, it can be observed with the naked eye that the polyimide precursor composition containing the siloxane compound in a varnish state becomes hazy from the content of 5 wt % or more.

Also, in FIG. 9, when the siloxane compound is added in an amount of 15 wt % or more, it can be observed that the haze rapidly increases. As such, the haze of the solution was observed to be insignificant, but the haze of the film did not appear. The haze of the film is shown in Table 10.

TABLE 10

| Content of additives, wt % | Comparative Example 1 | Example 7 | | |
|---|---|---|---|---|
| | 0 | 1 | 5 | 10 |
| Haze | 0.2 | 0.12 | 0.11 | 0.13 |

From the results of Table 10, it can be seen that the polyimide film prepared in Example 7 also has improved haze characteristics. Accordingly, the present invention can provide a polyimide precursor composition having improved storage stability by adding a siloxane compound having a novel structure that does not react with a polyamic acid to the polyimide precursor composition. From this, it is possible to provide a multifunctional polyimide film having improved optical isotropic properties and residual stress reduction property with respect to the substrate, and having improved adhesion to an inorganic substrate.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A polyimide precursor composition comprising: a siloxane compound represented by formula 1 or formula 2 and a polyamic acid:

[Formula 1]

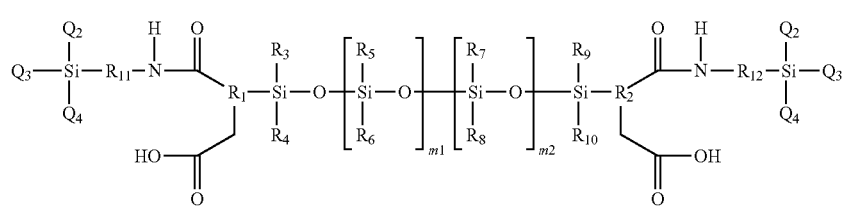

[Formula 2]

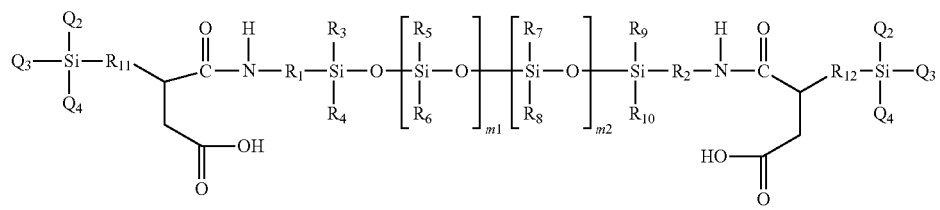

in the formulas 1 and 2, $Q_2$, $Q_3$ and $Q_4$ are each independently selected from a hydrogen atom, an alkyl group having 1 to 5 carbon atoms, and an alkoxy group having 1 to 5 carbon atoms, $R_1$, $R_2$, $R_{11}$ and $R_{12}$ are each independently a single bond or an organic group having 1 to 20 carbon atoms, $R_3$ to $R_{10}$ are each independently an aliphatic group having 1 to 3 carbon atoms or an aromatic group having 6 to 12 carbon atoms, and m1 and m2 are each independently an integer of 0 or more, wherein the polyimide precursor composition has a viscosity of 3,000 cP to 9,000 cP at 25° C.

2. The polyimide precursor composition according to claim 1, wherein m1 and m2 are each independently an integer of 1 or more, and the molecular weight of the compound of the formula 1 or formula 2 is 10,000 or less.

3. The polyimide precursor composition according to claim 1, wherein the siloxane compound represented by formula 1 is represented by formula 1-1 and the siloxane compound represented by formula 2 is represented by formula 2-1 wherein, $Q_2$, $Q_3$, $Q_4$, $R_1$, to $R_{12}$, m1 and m2 are as defined in claim 1.

4. The polyimide precursor composition according to claim 1, wherein $R_1$, $R_2$, $R_{11}$ and $R_{12}$ are each independently a single bond or an alkylene group having 1 to 10 carbon atoms.

5. The polyimide precursor composition according to claim 1, wherein at least one of $R_3$ to $R_{10}$ comprises an aromatic group having 6 to 12 carbon atoms.

6. A method for producing the siloxane compound in the polyimide precursor composition of claim 1, comprising reacting a compound of the following formula with a compound of formula b-1 and a compound of formula b-2:

[Formula a]

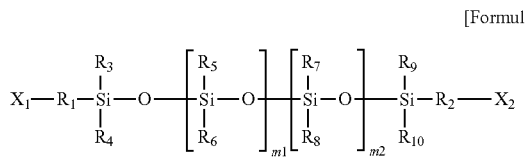

[Formula 1-1]

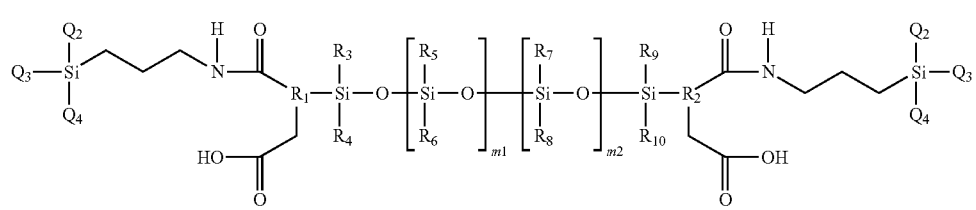

[Formula 2-1]

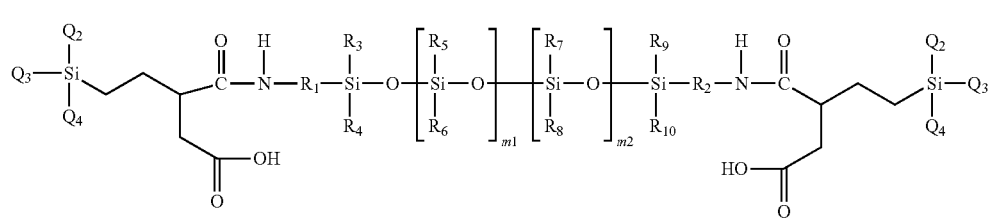

-continued

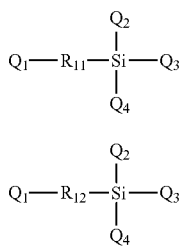
[Formula b-1]

[Formula b-2]

in the formulae a, b-1 and b-2, $X_1$ and $X_2$ are each independently an anhydride group, an amine group, a carboxyl group or an ester group, $R_1$, $R_2$, $R_{11}$ and $R_{12}$ are each independently a single bond or an organic group having 1 to 20 carbon atoms, $R_3$ to $R_{10}$ are each independently an aliphatic group having 1 to 3 carbon atoms or an aromatic group having 6 to 12 carbon atoms, m1 and m2 are each independently an integer of 0 or more, Q1 is an amine group, an isocyanate group or an anhydride group, and $Q_2$, $Q_3$ and $Q_4$ are each independently a hydrogen atom, an alkyl group having 1 to 5 carbon atoms, or an alkoxy group having 1 to 5 carbon atoms.

7. The method for producing the siloxane compound in the polyimide precursor composition according to claim 6, wherein each of the formula b-1 and formula b-2 is represented by the following formula b:

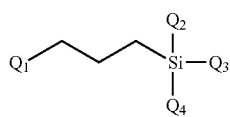
[Formula b]

in the formula b, $Q_1$, $Q_2$, $Q_3$ and $Q_4$ are as defined in claim 6.

8. The polyimide precursor composition according to claim 1, comprising the siloxane compound in an amount of 1 to 15% by weight based on the total weight of the polyimide precursor composition.

9. A polyimide film formed from the polyimide precursor composition of claim 1.

10. The polyimide film according to claim 9, wherein the polyimide film has a residual stress of 35 MPa or less with respect to an inorganic substrate.

11. The polyimide film according to claim 9, wherein the polyimide film has a Real Bow value of 35 μm or less.

12. The polyimide film according to claim 11, wherein the polyimide film has a retardation in the thickness direction of 420 nm or less.

13. A display substrate comprising the polyimide film formed from the polyimide precursor composition of claim 1.

* * * * *